(12) United States Patent
Shimizu et al.

(10) Patent No.: US 6,219,027 B1
(45) Date of Patent: *Apr. 17, 2001

(54) IMAGE DISPLAY SYSTEM WITH INTELLIGENT POINTER DISPLAYING CAPABILITY

(75) Inventors: Masayoshi Shimizu; Shoji Suzuki; Tsugio Noda, all of Kawasaki (JP)

(73) Assignee: Fujitsu Limited, Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,659

(22) Filed: Jan. 16, 1998

(30) Foreign Application Priority Data

Jan. 17, 1997 (JP) ..................................... 9-006937

(51) Int. Cl.$^7$ ....................................................... G06F 3/14
(52) U.S. Cl. ............................................ 345/145; 345/329
(58) Field of Search ................................... 345/145, 146, 345/118, 121, 123, 127, 132, 340, 339, 341, 342, 346, 348, 349, 329–332

(56) References Cited

U.S. PATENT DOCUMENTS

| | | | |
|---|---|---|---|
| 5,793,354 | * | 8/1998 | Kaplan .................................. 345/157 |
| 5,815,137 | * | 9/1998 | Weatherford et al. ............... 345/145 |
| 5,821,916 | * | 10/1998 | Watson et al. ........................ 345/145 |
| 5,852,431 | * | 12/1998 | Ito ......................................... 345/145 |
| 5,898,419 | * | 4/1999 | Liu ......................................... 345/127 |
| 5,898,432 | * | 4/1999 | Pinard ................................... 345/334 |
| 5,912,666 | * | 6/1999 | Watson et al. ........................ 345/339 |
| 5,933,135 | * | 8/1999 | Martin ................................... 345/179 |

* cited by examiner

Primary Examiner—Steven Sax
(74) Attorney, Agent, or Firm—Arent Fox Kintner Plotkin & Kahn, PLLC

(57) ABSTRACT

An image display system, provided with a plurality of display units and a pointing device for moving a cursor between the plurality of display units, includes a cursor position detecting unit for detecting a desired cursor movement that corresponds to an operation of the pointing device and a cursor movement control unit for moving the cursor commensurate with the operation of the pointing device such that the cursor is moved differently from one display unit to another.

12 Claims, 20 Drawing Sheets

IMAGE DISPLAY SYSTEM WITH INTELLIGENT POINTER DISPLAYING CAPABILITY

BACKGROUND OF THE INVENTION

1. Field of the Invention

The present invention generally relates to image display systems and more particularly, to an image display system for displaying images using a plurality of display apparatuses.

Recently, users of a personal computer often run a plurality of programs such as a word processor or a spread sheet simultaneously or have a plurality of sets of data displayed on the screen. In such a type of usage, the content to be displayed may be so voluminous that the display area of a single display device proves insufficient. For this reason, systems provided with a plurality of display devices are sometimes used.

2. Description of the Related Art

Japanese Laid-Open Patent Application No. 62-229325 and Japanese Laid-Open Patent Application No. 62-256125 disclose methods for displaying a cursor in a system provided with a plurality of display device.

FIG. 1 shows a coordinate system used in Japanese Laid-Open Patent Application No. 62-229325. As shown in FIG. 1, in Japanese Laid-Open Patent Application No. 62-229325, the position of the pointer is updated within the same coordinate system shared by a CRT 1 and a CRT 2.

FIG. 2 is a flowchart showing an algorithm of a process according to Japanese Laid-Open Patent Application No. 62-229325.

As shown in FIG. 2, the pointer position is updated in step S202 without making any distinction between the CRT 1 and the CRT 2.

FIG. 3 shows a coordinate system used in Japanese Laid-Open Patent Application No. 62-256125.

As shown in FIG. 3, in Japanese Laid-Open Patent Application No. 62-256125, the position of a mouse cursor is updated within the same coordinate system (referred to as BMM in Japanese Laid-Open Patent Application No. 62-256125) shared by the CRT 1 and the CRT 2.

FIG. 4 is a flowchart showing an algorithm of a process according to Japanese Laid-Open Patent Application No. 62-256125.

As shown in FIG. 4, the cursor coordinate is calculated in step S2 without making any distinction between the CRTs.

The related art disclosed in Japanese Laid-Open Patent Application No. 62-229325 and No. 62-256125 does not assume a case where the number of pixels (pixel count) and a pixel pitch (pixel-to-pixel pitch) differ from one display device (CRT or the like) to another. In other words, the related art does not provide for a process whereby the cursor movement per a mouse input differs from one display device to another in a system where a plurality of display devices characterized by different pixel count and pixel pitch are used. Such an arrangement has a disadvantage in that the cursor cannot be moved smoothly between the plurality of display devices.

One type of problem (first problem) related to movement of the cursor is caused by failure to provide a method for updating a cursor display position for each display device. Another type of problem (second problem) is caused by failure to adapt for a cursor movement between different means of display by updating the cursor depending on the display means and the displayed position.

A description will now be given of these problems, by contrasting the problems with requirements of users operating a pointing device such as a mouse in a system in which a plurality of display devices are used.

The first problems will now be divided into aspects 1(*a*), 1(*b*) and 1(*c*).

The aspect 1(*a*) of the first problem is caused even when the plurality of display devices have identical characteristics (pixel count, pixel pitch etc.) and concerns a user request that the cursor movement be adapted for the displayed content in respective display devices. The aspects 1(*b*) and 1(*c*) concern a user request that the cursor be moved in a regular manner from one display device to another even when the display devices have different characteristics.

A description will now be given of the details of the individual aspects.

According to aspect 1(*a*), the cursor movement (velocity) cannot be selectively set for individual display devices. In a system using a plurality of display devices, the displayed content may be varied from one display device to another. For example, one display device could be dedicated to display of documents, while another display device could be dedicated to display of diagrams. Finer pointing is required in the display device dedicated to display of diagrams than in the display device dedicated to display of documents. A requirement exists that the mouse cursor be moved slower in the display device dedicated to diagrams than in the display device dedicated to documents in order to enable finer pointing.

However, no technology has been available to vary a relationship between an output signal of a pointing device and a distance between cursor display positions before and after the movement (the number of pixels by which the positions are offset from each other).

According to aspect 1(*b*), it is impossible to ensure that, given the same physical movement of the mouse, the distance on one display device between cursor display positions before and after the movement is the same as the corresponding distance on another display device. A requirement exists, particularly in those cases where similar tasks are carried out using a plurality of display devices, that the physical distance that the cursor moves on one display device be the same as the corresponding distance on another display device, given the same mouse movement. According to such a requirement, it is desired that the mouse pointer exhibits a 5 cm on-screen movement both in the display device D1 and in the display device D2, when the mouse is moved 15 cm, for example.

FIG. 5 illustrates aspect 1(*b*) of the related art. Referring to FIG. 5, a display system includes display devices D31 and D32, a computer 21, a keyboard 22 and a mouse 23.

As indicated by the arrows A1 and A2, a given movement of the mouse 23 do not cause the pointer to move the same on-screen distance on the display device D31 and on the display device D32 if the pixel pitches of the display devices D31 and D32 are different.

According to aspect 1(*c*), it is impossible to match the rate of a cursor movement on one display device with the corresponding rate on another display device. A requirement exists, when a plurality of display devices are used, that the rate of a mouse cursor movement be the same from one display device to another. For example, assuming that the cursor can be moved end to end on a display device D1 when the mouse is moved 15 cm, users may desire that the cursor on another display device D2 be also moved end to end. While aspect 1(*b*) concerns matching of the distances, aspect 1(*c*) concerns the rate of the on-screen pointer movement.

An operator using a mouse may often have an image of how far the mouse should be moved in order to move the pointer from one end of the screen to another. Such an operator may find a system difficult to use if the pointer moves end to end on one display device and only moves ⅓ of the width of the screen on another display device, when the mouse is moved 15 cm. Stated otherwise, such a user may want the pointer to move at a regular rate on the screen instead of wanting the pointer to move the same distance on different display devices in response to the same mouse operation.

FIG. 6 illustrates aspect 1(c) of the related art. In FIG. 6, those components that are the same as the corresponding components in FIG. 5 are designated by the same reference numerals and the description thereof is omitted.

Referring to FIG. 6, a display system includes display devices D41 and D42 characterized by different pixel counts. The display device D41 is a 640×480 pixel display and the display device D42 is a 1600×1200 pixel display.

As indicated by the arrows B1 and B2, the same physical movement of the mouse causes the cursor to move end to end in the display device D41 but causes the cursor to move only a certain distance on the display device D42.

A description will now be given of the second problem.

According to the second problem, the cursor position changes differently depending on its position on the screen. A requirement exists that such a difference be eliminated.

More specifically, users having such a requirement and using two display devices arranged horizontally may want the cursor to change its display position in a regular manner when the cursor moves from the top of screen and when it moves from the bottom thereof.

FIG. 7 illustrates the second problem of the related art. Referring to FIG. 7 those components that are the same as the corresponding components are designated by the same reference numerals and the description is omitted.

As indicated by the broken lines, when the cursor of the mouse 23 is moved from the display device D41 to the display device D42 or vice versa, the cursor changes its position differently depending on the position of the cursor on a source screen. More specifically, movement of the cursor between point a and point A occurs in orientations different from the corresponding orientations of the movement between point d and point D.

The reason for this irregularity is that, according to the display position calculating method of the related art, the mouse cursor is displayed at the same vertical coordinate before and after the movement from one display device to another. Alternatively, a predetermined value is added to the vertical coordinate on the source display device to determine the vertical coordinate on the destination display device. When the distance between the points a and d on the display device D41 differs from the distance between the points A and D on the display device D42, that difference in the distances is reflected by different vertical positions of the cursor on the display devices D41 and D42. When the number of pixels displayed by the display device D41 is different from that of the display device D42, the cursor moving leftward from point E may not be displayed on the display device D41 at all.

SUMMARY OF THE INVENTION

Accordingly, an object of the present invention is to provide an image display system in which the aforementioned problems are eliminated.

Another and more specific object of the present invention is to provide an image display system in which a pointer of a pointing device is moved identically on a plurality of display devices characterized by different image displaying capabilities.

The aforementioned objects can be achieved by an image display system provided with a plurality of display means and a pointing device for moving a cursor between said plurality of display means, comprising: cursor position detecting means for detecting a cursor movement input that corresponds to an operation of the pointing device; and cursor movement control means for moving the cursor commensurate with the operation of the pointing device such that, given the same cursor movement input detected by said cursor position detecting means, an on-screen movement of the cursor differs from one display means to another.

According to the image display system of the present invention, cursor movement and cursor position can be optimized for individual display means. Thus, the cursor can be moved between a plurality of display means in such a way as to best fit the image content displayed on the display means.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 8:
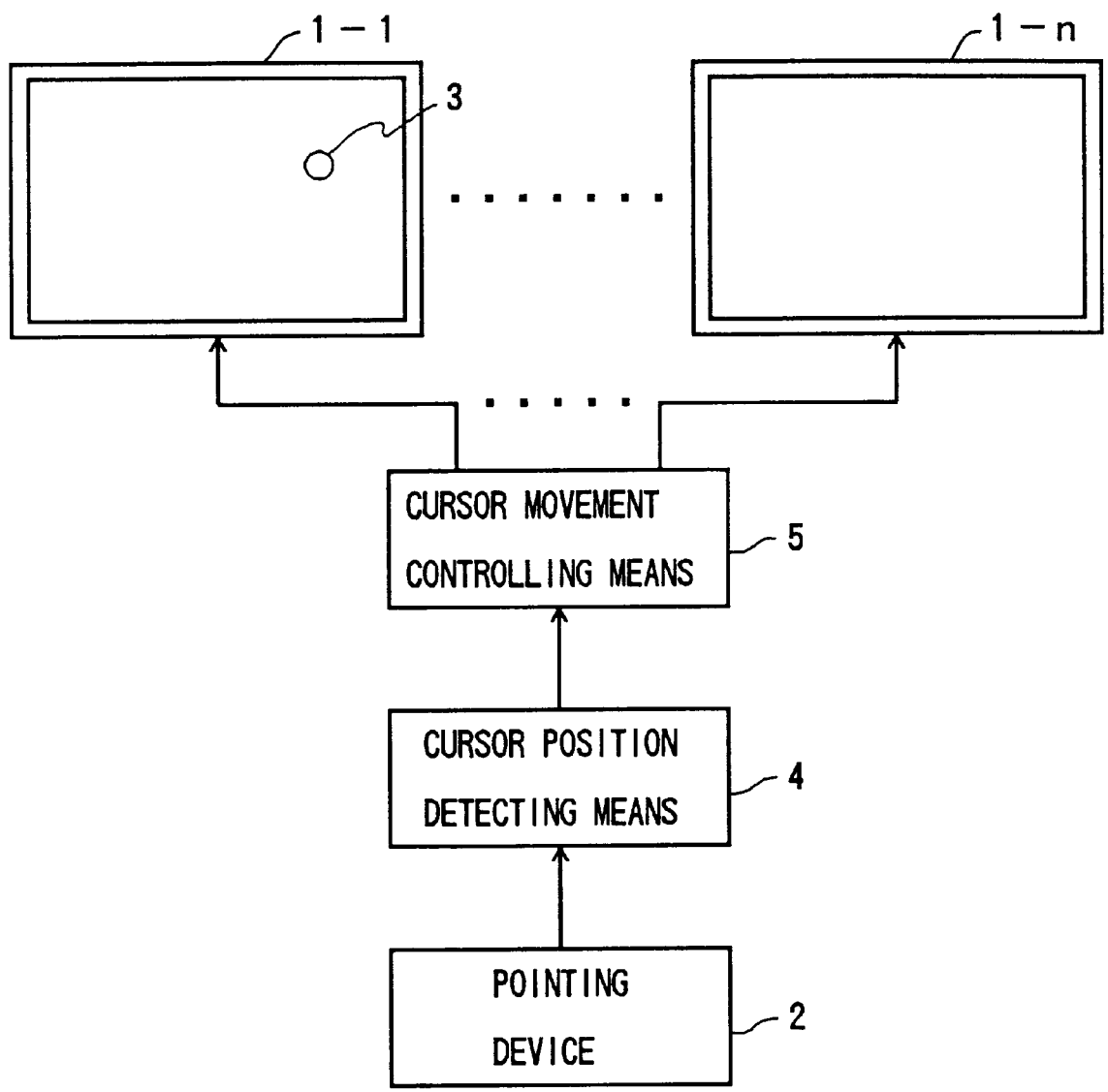
FIG. 8 illustrates an operating principle of the present invention.

FIG. 8 illustrates an operating principle of the present invention.

An image display system according to the present invention comprises a pointing device 2, cursor position detecting means 4, cursor movement controlling means 5 and a plurality of display means 1-1–1-n.

The pointing device 2 is used to move a cursor 3 between the plurality of display devices 1-1–1-n.

The cursor movement controlling means 5 moves the cursor 3 responsive to the operation of the pointing device 2, calling upon different conditions provided for different display means.

Figure 9:
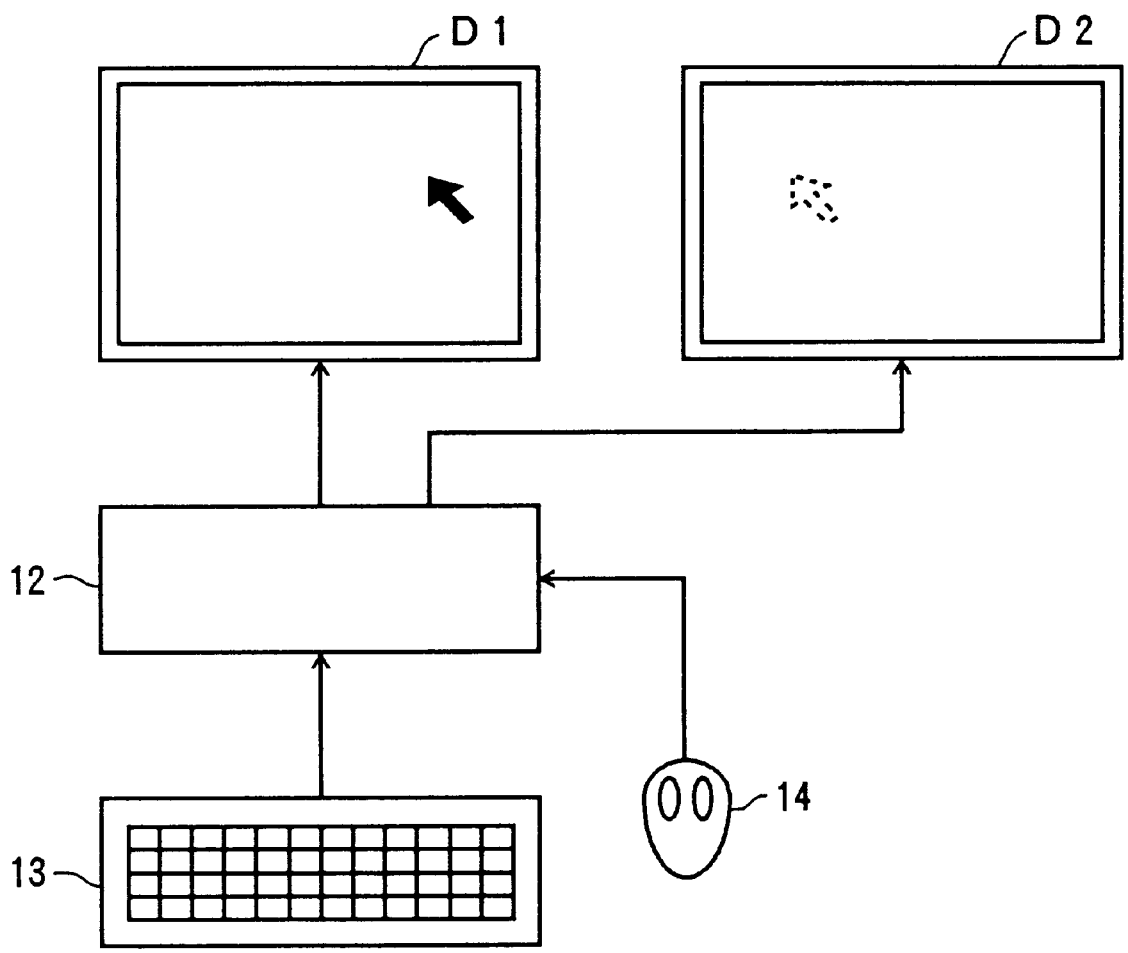
FIG. 9 illustrates a schematic construction of an image display system according to a first embodiment of the present invention.
Figure 10:
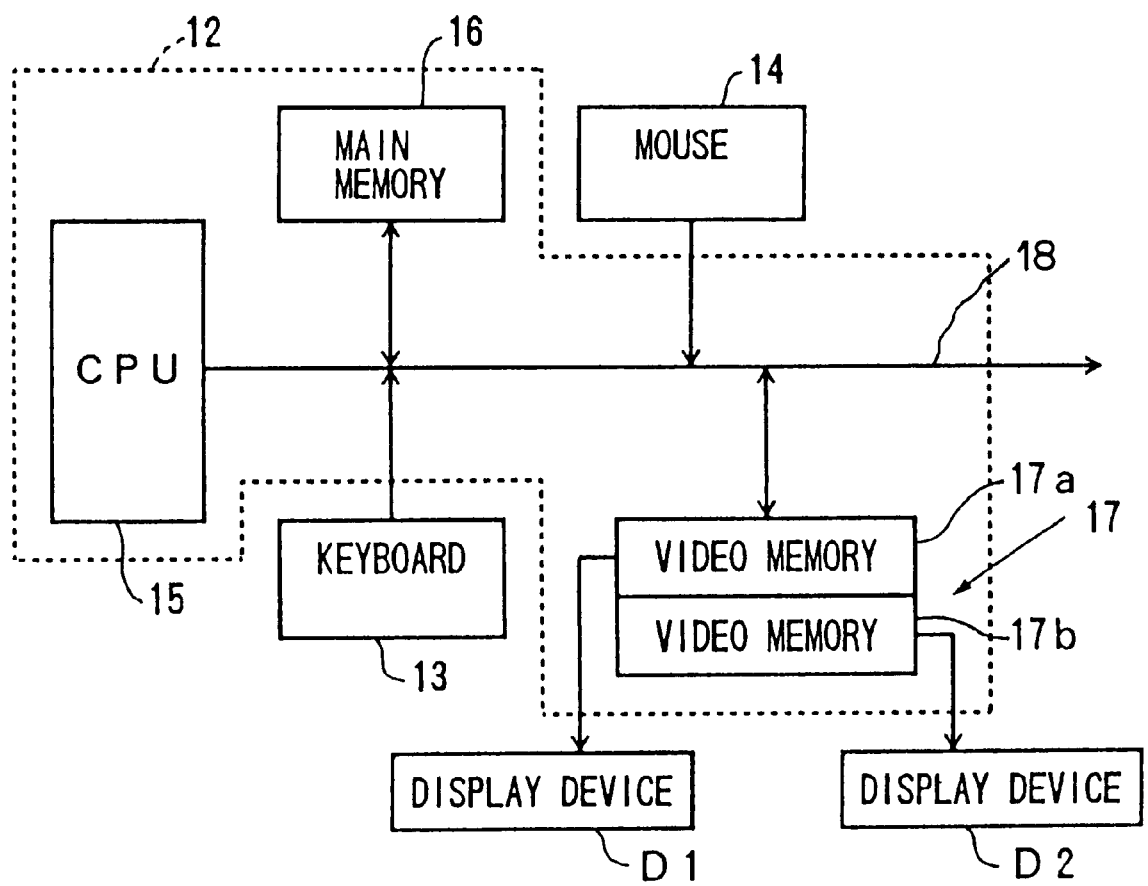
FIG. 10 is a block diagram showing a system of the first embodiment.

FIG. 9 illustrates a schematic construction of the image display system according to a first embodiment of the present invention. FIG. 10 is a block diagram showing the system of the first embodiment.

The image display system of the first embodiment is a personal computer image display system 11.

Referring to FIG. 9, the personal computer image display system 11 comprises a personal computer 12, display devices D1 and D2 for displaying data processed by the personal computer 12, a keyboard 13 for inputting data and instructions to the personal computer 12, a mouse 14 for moving a cursor to images displayed on the display devices D1 and D2.

Referring also to FIG. 10, the personal computer 12 comprises a CPU 15 for processing data, a main memory 16 for storing data and programs, a video memory 17 for holding image data of images to be displayed on the display devices D1 and D2, and a bus 18 for connecting the CPU 15, the main memory 16 and the video memory 17. The video memory 17 comprises a video memory 17a for the display device D1 and a video memory 17b for the display device D2.

The display device D1 and the display device D2 differ from each other in pixel count and pixel pitch, which are inclusively referred to as pixel arrangement in the claims.

More specifically, the display device D1 is capable of displaying 640 pixels in the X direction and 480 pixels in the Y direction. The pixel pitch is set to 0.5 mm. The display device D2 is capable of displaying 1600 pixels in the X direction and 1280 pixels in the Y direction. The pixel pitch is set to 0.25 mm, that is, about half that of the display device D1. The ratio between the pixel count of the display device D1 and that of the display device D2 is 2:5.

A cursor movement process for moving the cursor between the display devices D1 and D2 is executed by the CPU 15 according to a program stored in the main memory 16.

The first embodiment uses a virtual mouse cursor coordinate system Cp which is separate from actual display coordinate systems of the display devices D1 and D2. The virtual coordinate system Cp is related to the display coordinate system C1 of the display device D1 and the display coordinate system C2 of the display device D2 in the following manner.

$$x1 = xp/2 \quad (1)$$

$$y1 = yp/2 \quad (2)$$

$$x2 = xp - 1280 \quad (3)$$

$$y2 = yp \quad (4)$$

The range of the coordinate system Cp is defined as follows.

$$0 \leq xp \leq 640, \ 0 \leq yp < 480 \quad (5)$$

$$640 \leq xp \leq 1440, \ 0 \leq yp \leq 640 \quad (6)$$

Figure 11:
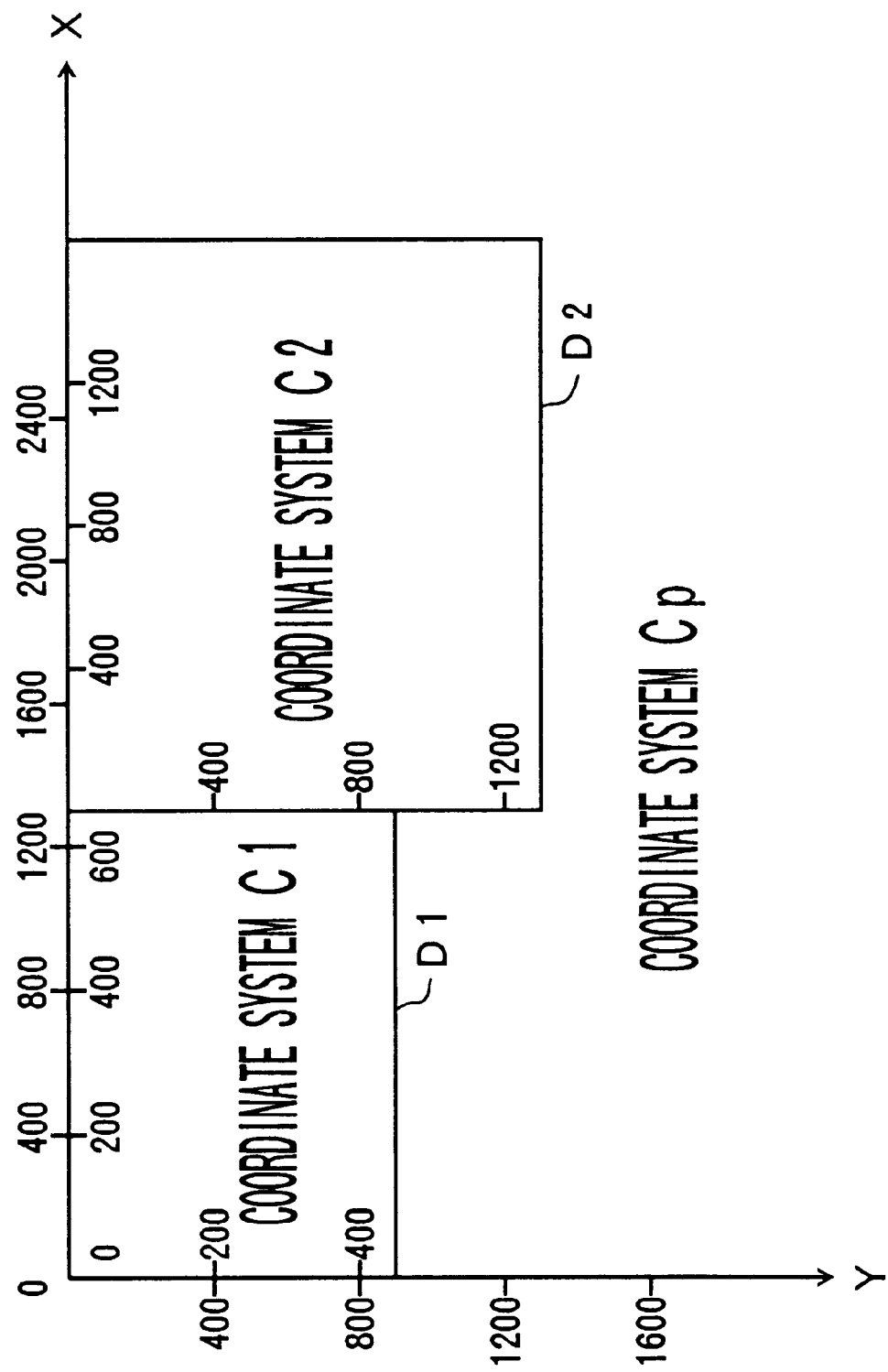
FIG. 11 illustrates the relationship between the virtual coordinate system of the cursor and the coordinate systems of displays according to the first embodiment.

FIG. 11 illustrates the relationship between the virtual coordinate system of the cursor and the coordinate systems of the displays according to the first embodiment. FIG. 11 is a graphical representation of the numeral relations of (1)–(6).

Referring to FIG. 11, X coordinates in the virtual coordinate system Cp are marked above the X axis and Y coordinates in the coordinate system Cp are marked to the left of the Y axis. X coordinates in the coordinate system C1 of the display device D1 and the coordinate system C2 of the display device D2 are marked below the X axis. Y coordinates in the coordinate systems C1 and C2 are marked to the right of the Y axis.

The virtual coordinate system Cp is configured for a pixel pitch of 0.25 mm. Since 1 pixel in the coordinate system C1 of the display device D1 having a pixel pitch of 0.5 mm corresponds to 2 pixels in the virtual coordinate system Cp, a given point may have a Y coordinate "400" in the virtual coordinate system Cp and "200" in the coordinate system C1. Another point may have a Y coordinate "800" in the virtual coordinate system Cp and "400" in the coordinate system C1.

Since 1 pixel in the coordinate system C2 of the display device D2 having a pixel pitch of 0.25 mm corresponds to 1 pixel in the virtual coordinate system Cp, a given point may have a Y coordinate "400" in the virtual coordinate system Cp and "400" in the coordinate system C1. Another point may have a Y coordinate "800" in the virtual coordinate system Cp and "800" in the coordinate system C1.

Figure 12:
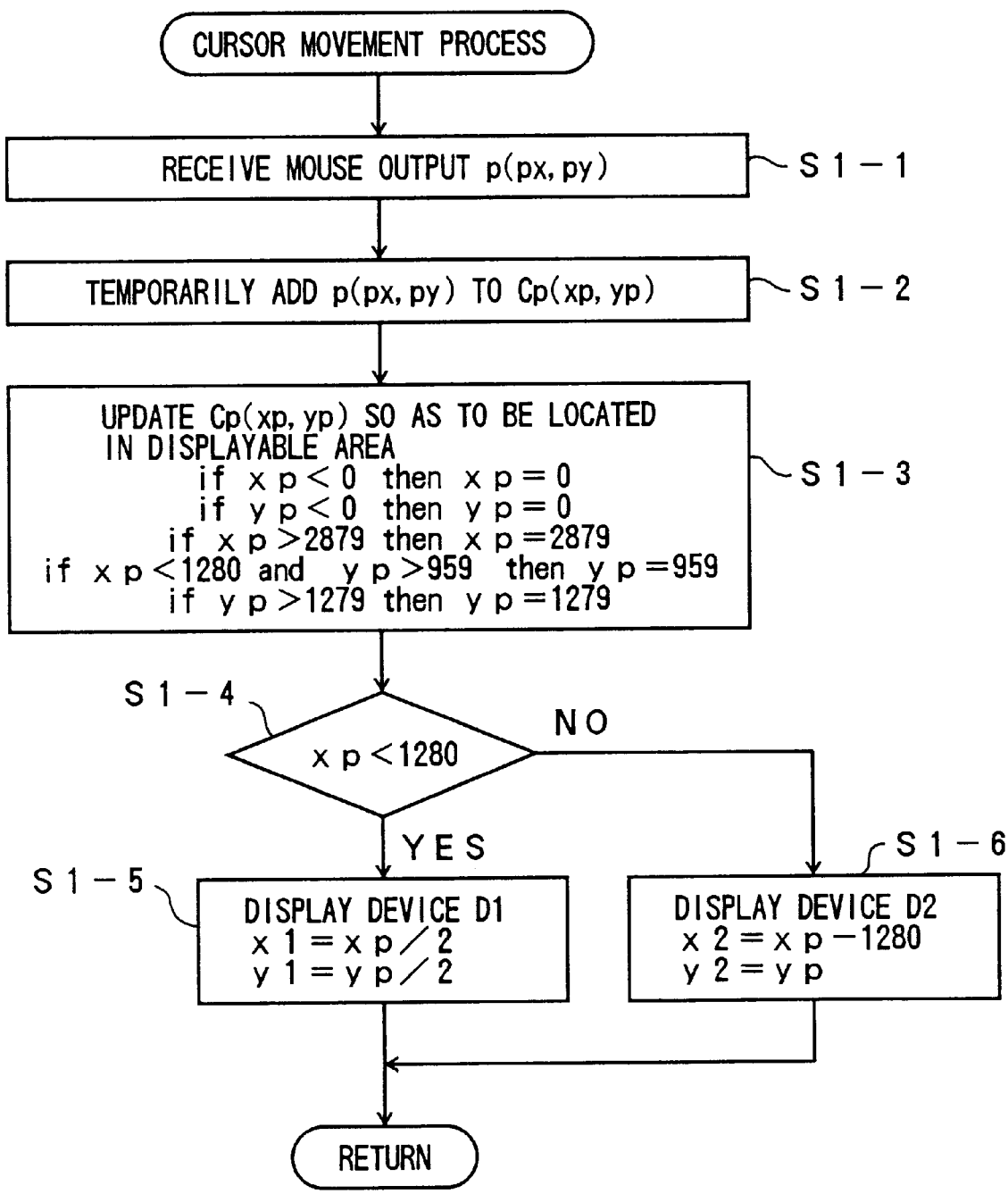
FIG. 12 is a flowchart showing a cursor movement process according to the first embodiment.

FIG. 12 is a flowchart showing a cursor movement process executed by the CPU 15 according to the first embodiment.

When the mouse 14 is operated, the CPU 15 is supplied, from the mouse 14, with information P(px, py) indicating the movement of a cursor. The CPU 15 then adds the information P(px, py) indicating the movement of the cursor to the current coordinates Cp(xp, yp) of the cursor in the virtual coordinate system Cp (steps S1-1, S1-2).

When the information P(px, py) indicating the movement of the cursor is added to the current cursor coordinates Cp(xp, yp) in the virtual coordinate system Cp in step S1-2, the cursor position in the virtual coordinate system Cp is updated.

The CPU 15 then modifies the cursor coordinates Cp(px, py) updated in step S1-2 so that the cursor coordinates Cp(px, py) are located in a displayable area (step S1-3).

More specifically, in step S1-3, if the X coordinate xp of the cursor coordinates Cp(px, py) updated in step S1-2 is smaller than 0, that is, if the X coordinate xp is smaller than the X coordinate of the horizontal edge of the coordinate system C1 of the display device D1, the X coordinate xp is located inside a displayable area of the display device D1 by setting the X coordinate xp to the X coordinate of the horizontal edge of the coordinate system C1 of the display device D1, that is, by setting the X coordinate xp to 0. If the Y coordinate yp is smaller than 0, that is, if the Y coordinate yp is smaller than the Y coordinate of the vertical edge of the coordinate systems C1 and C2 of the display devices D1 and D2, respectively, the Y coordinate yp is located inside the displayable area of the display devices D1 and D2 by setting the Y coordinate yp to the Y coordinate of the vertical edge of the coordinate systems C1 and C2 of the display devices D1 and D2, respectively, that is, by setting the Y coordinate yp to 0.

If the X coordinate xp is greater than 2879, that is, if the X coordinate is greater than the X coordinate of the horizontal edge of the coordinate system C2 of the display device D2, the X coordinate xp is located inside the displayable area of the display device D2 by setting the X coordinate xp to the X coordinate of the horizontal edge of the coordinate system of the display device D2, that is, by setting the X coordinate to 2879.

If the X coordinate xp is smaller than 1280 and the Y coordinate yp is greater than 959, that is, greater than the Y coordinate yp of the vertical edge of the coordinate system C1 of the display device D1, the Y coordinate yp is located inside the displayable area of the display device D1 by setting the Y coordinate yp to the Y coordinate yp of the vertical edge of the coordinate system C1 of the display device D1, that is, by setting the Y coordinate yp to 959.

If the Y coordinate yp is greater than 1279, that is, greater than the Y coordinate of the vertical edge of the coordinate system C2 of the display device D2, the Y coordinate yp is located inside the displayable area of the display device D2 by setting the Y coordinate yp to the Y coordinate of the vertical edge of the coordinate system C2 of the display device D2, that is, by setting the Y coordinate yp to 1279.

With the above-described arrangement, the virtual cursor coordinates Cp(xp, yp) are located in the coordinate systems C1 and C2, that is, in the displayable area of the display devices D1 and D2.

Having located the virtual coordinates Cp(xp, yp) in the coordinate systems C1 and C2 of the display devices D1 and D2, respectively, the CPU 15 then determines whether the cursor is located in the displayable area of the display device D1 or the displayable area of the display device D2 (step S1-4).

More specifically, in step S1-4, the X coordinate xp of the virtual cursor coordinates Cp(xp, yp) is referred to for the determination. If the X coordinate xp is smaller than 1280, it is determined that the cursor is located in the displayable area of the display device D1. If the X coordinate xp is equal to or greater than 1280, it is determined that the cursor is located in the displayable area of the display device D2.

If it is determined in step S1-4 that the cursor is located in the displayable area of the display device D1, the CPU 15 converts the virtual cursor coordinates Cp(xp, yp) to coordinates C1(x1, y1) of the display device D1 and stores image data of the cursor in the video memory 17a for the display device D1 at addresses corresponding to the coordinates C1(x1, y1) (step S1-5).

More specifically, in step S1-5, the CPU 15 sets the X coordinate x1 of the coordinates C1(x1, y1) to xp/2. The CPU 15 also sets the Y coordinate y1 of the coordinates C1(x1, y1) to yp/2.

If it is determined in step S1-4 that the cursor is located in the displayable area of the display device D2, the CPU 15 converts the virtual cursor coordinates Cp(xp, yp) to the coordinates C2(x2, y2) of the display device D2 and stores image data of the cursor in the video memory 17b for the display device D2 at addresses corresponding to the coordinates C2(x2, y2) (step S1-6).

More specifically, in step S1-6, the CPU 15 converts the virtual cursor coordinates Cp(xp, yp) to the coordinates C2(x2, y2) of the display device D2 by subtracting 1280 (the X coordinate of the horizontal edge of the coordinate system C1 of the display device D1) from the X coordinate xp of the virtual cursor coordinates Cp(xp, yp). Since the pixel pitch of the display device D2 is the same as that of the virtual coordinate system, the Y coordinate y2 of the coordinates C2(x2, y2) of the display device D2 is set to the Y coordinate yp.

With the above-described arrangement, the ratio between the movement of the cursor on the display device D1 and the movement on the display device D2 is 1:2. Since the ratio between the pixel pitch on the display device D1 and the pixel pitch on the display device D2 is 2:1, the cursor display position moves regularly across the display devices D1 and D2.

Thus, according to the first embodiment, regular movement of the cursor across the display devices D1 and D2 is ensured notwithstanding the difference otherwise found between the mouse-driven cursor movement on the display device D1 and the corresponding movement on the display device D2. In this way, the problem relating to aspect 1(c) of the related art is resolved.

There are other approaches for determining and converting the cursor movement. For example, when the mouse cursor is displayed on the display device D1, outputs from the mouse could be processed in steps of 2, and, when the mouse cursor is displayed on the display device D2, outputs from the mouse could be processed in steps of 1.

According to this variation of the first embodiment, when the mouse cursor display position moves from the display device D1 to the display device D2, y1 is added to the Y coordinate y1 of the coordinates C1(x1, y1) of the display device D1 (i.e. y1 is doubled) so as to obtain the Y coordinate y2 of the coordinates C2(x2, y2) of the display device D2.

When the mouse cursor display position moves from the display device D2 to the display device D1, −y2/2 is added to the Y coordinate y2 of the coordinates C2(x2, y2) of the display device D2 (i.e. y2 is divided by 2) so as to obtain the Y coordinate y1 of the coordinates C1(x1, y1) of the display device D1. In this way, the problem relating to aspect 1(c) is resolved.

The first embodiment and its variation described are directed to the display position of the mouse cursor. However, the present invention is also applicable to calculating the display position of painting software objects and the like moved on the screen by mouse operation. Although the above description gives an example of two display means connected to each other, the first embodiment and its variation can easily be applied to three or more display means connected to each other.

Further, the above description assumes that a predetermined mathematical relation is used to update the display position. However, the method of calculating the display position may be determined by the user for each display device.

The variation of the first embodiment may be modified such that the user specifies the step count for each display means so that the step count is referred to when the display position is updated.

Alternatively, several predetermined speed patterns for displaying the cursor may be provided as options. For example, a high-speed pattern and a low-speed pattern could be provided for the user to choose from. The display position may be updated such that outputs from the mouse are processed in steps of 1 in accordance with the high-speed pattern and in step of 2 in accordance with the low-speed pattern.

The ratio between the pixel count of the display device D1 and that of the display device D2 is 2:5. Thus, with the related art discussed with reference to FIG. 5, a manual mouse movement that causes the cursor to move from end to end on the display device D1 can only move the cursor 40% of the same distance on the display device D2.

Figure 1:
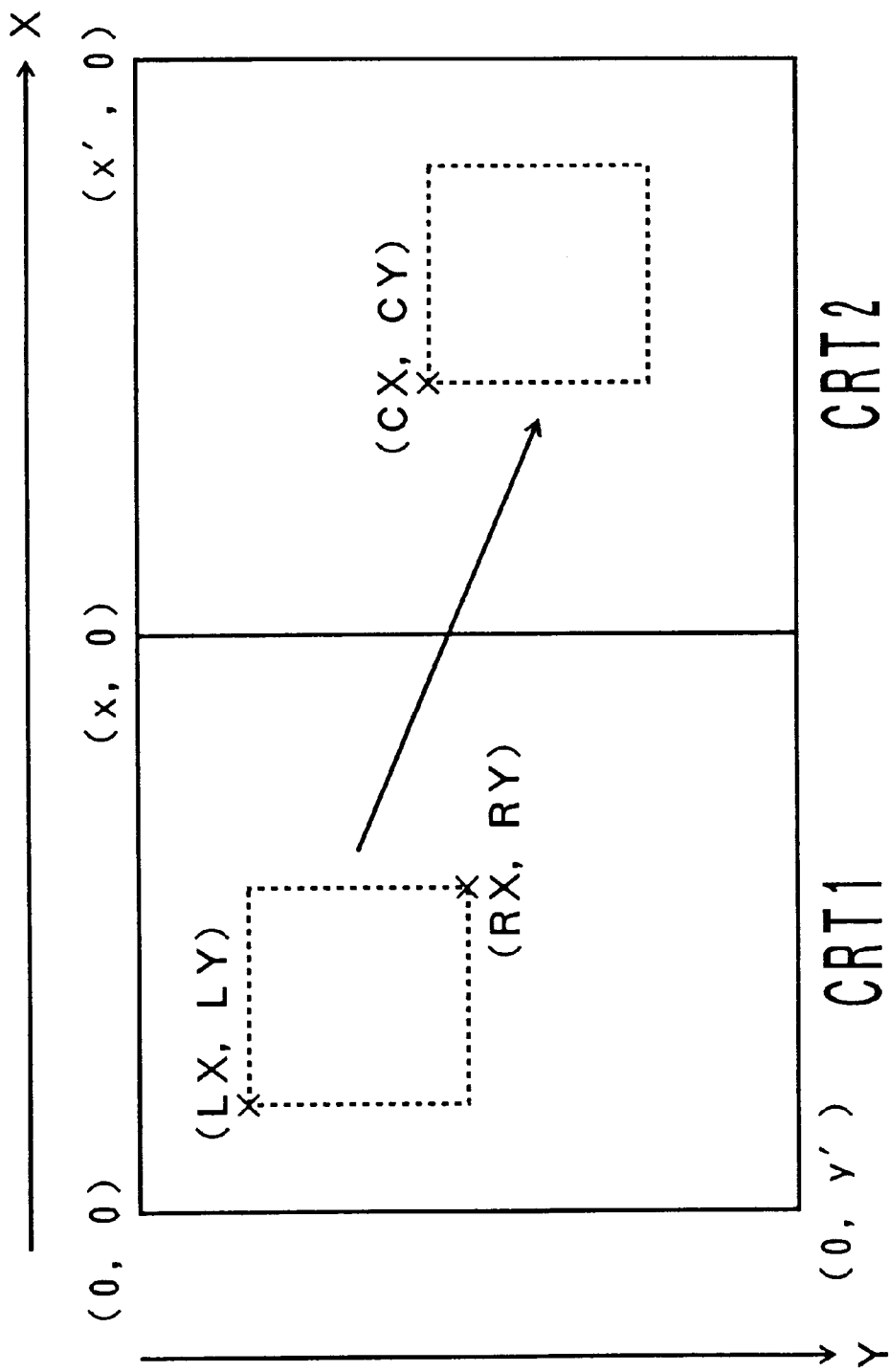
FIG. 1 shows a coordinate system used in a first image display system of the related art.
Figure 2:
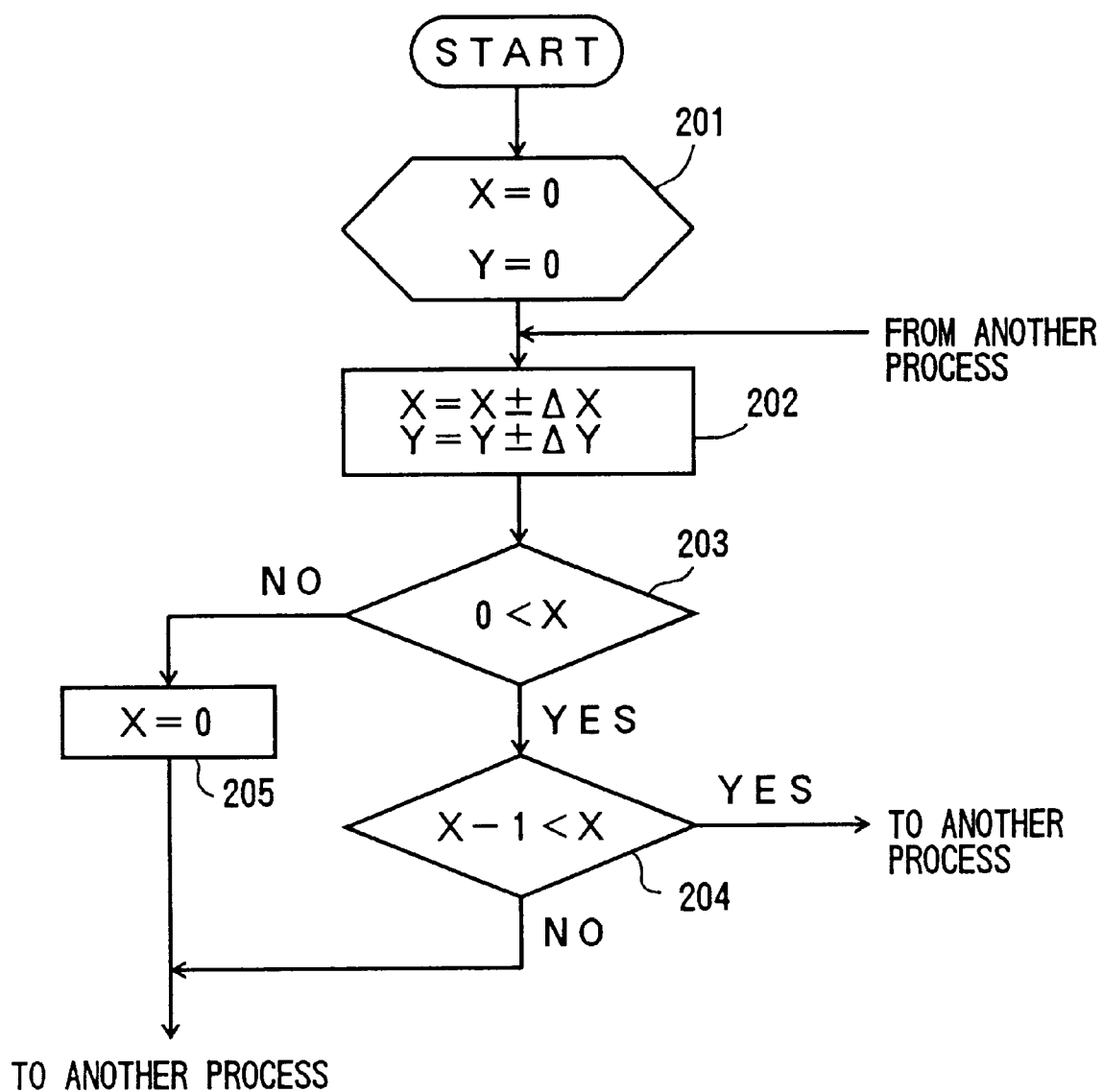
FIG. 2 is a flowchart showing an algorithm of a process in the first image display system of the related art.
Figure 3:
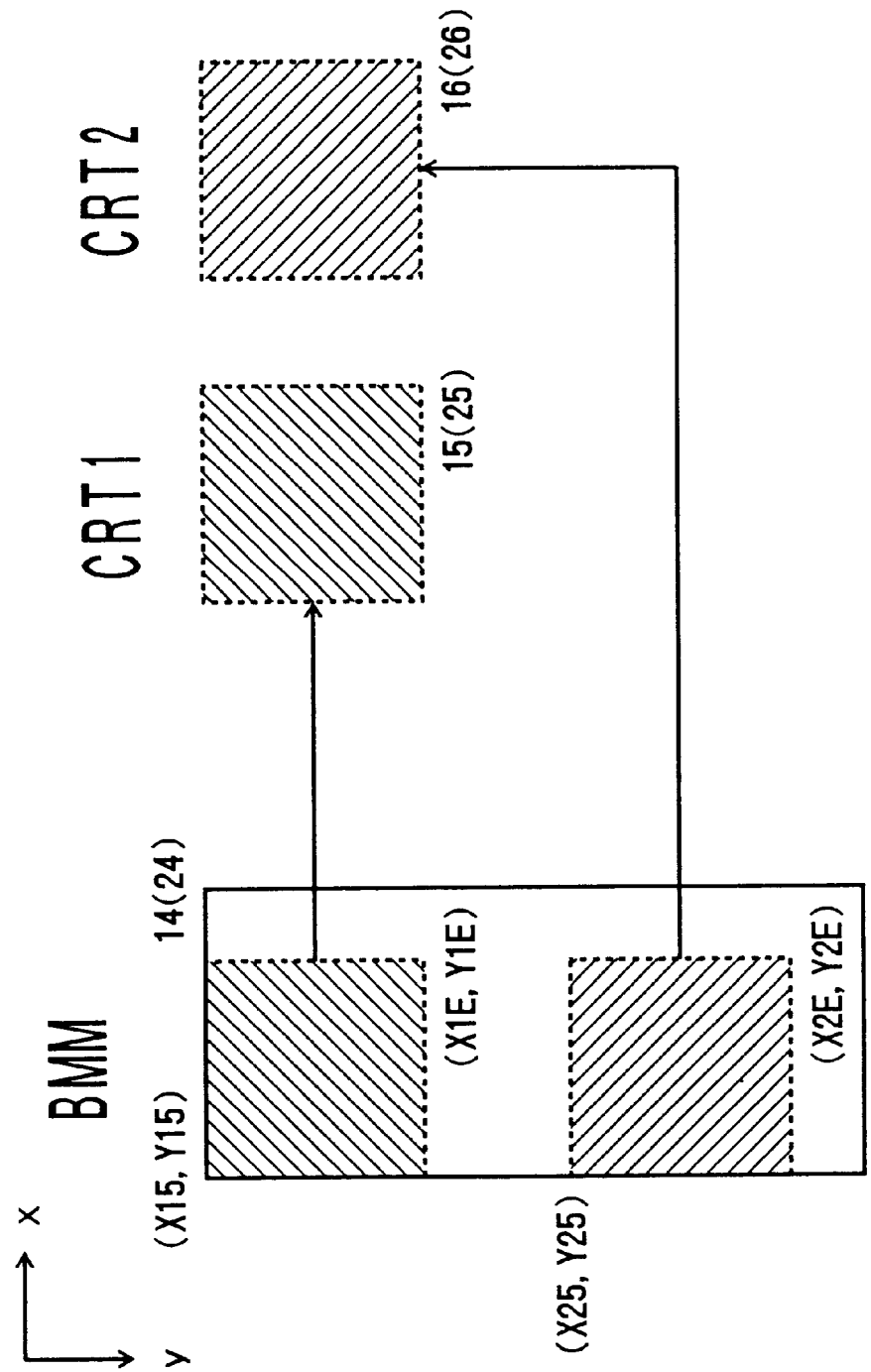
FIG. 3 shows a coordinate system used in a second image display system of the related art.
Figure 4:
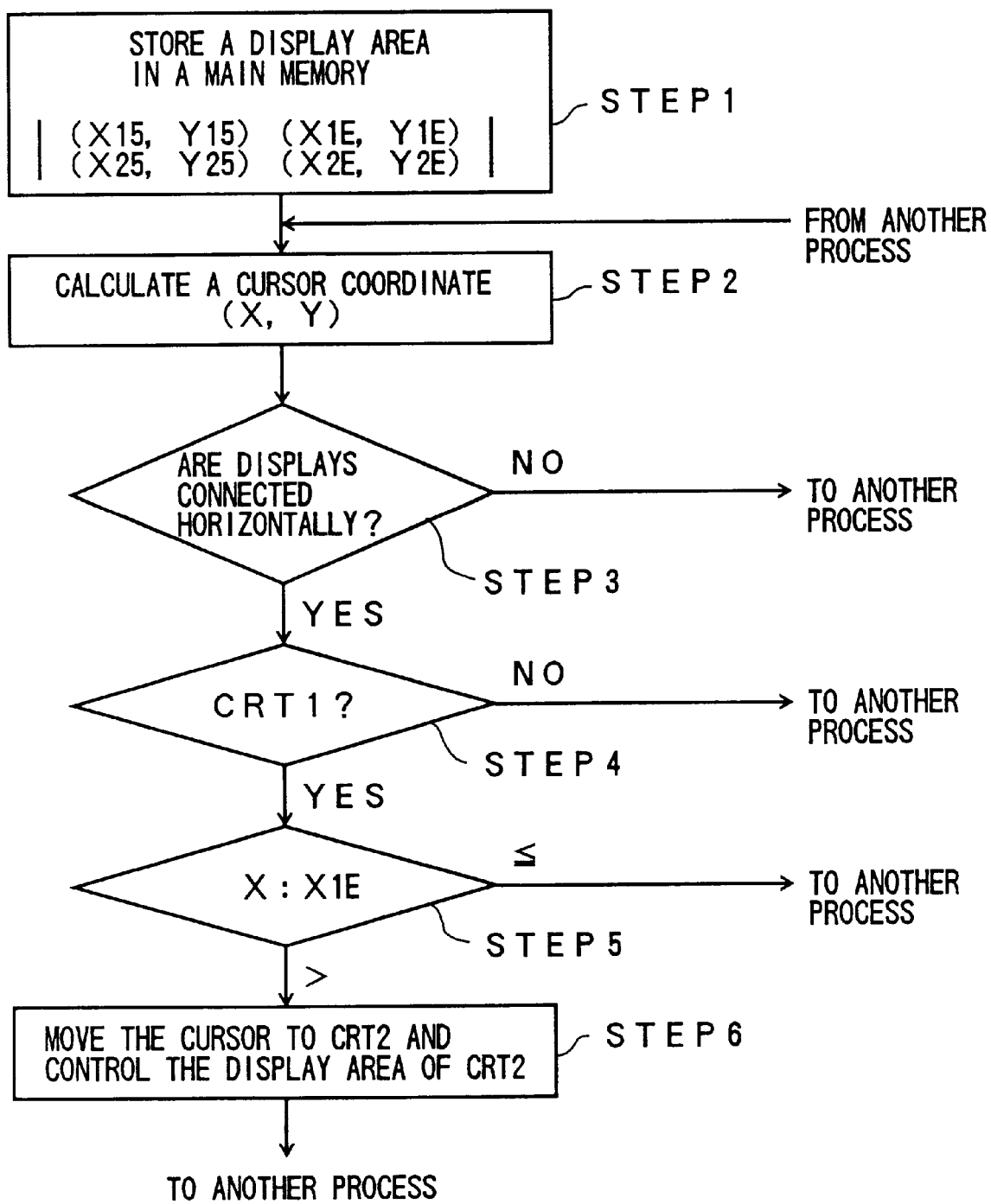
FIG. 4 is a flowchart showing an algorithm of a process in the second image display system of the related art.
Figure 5:
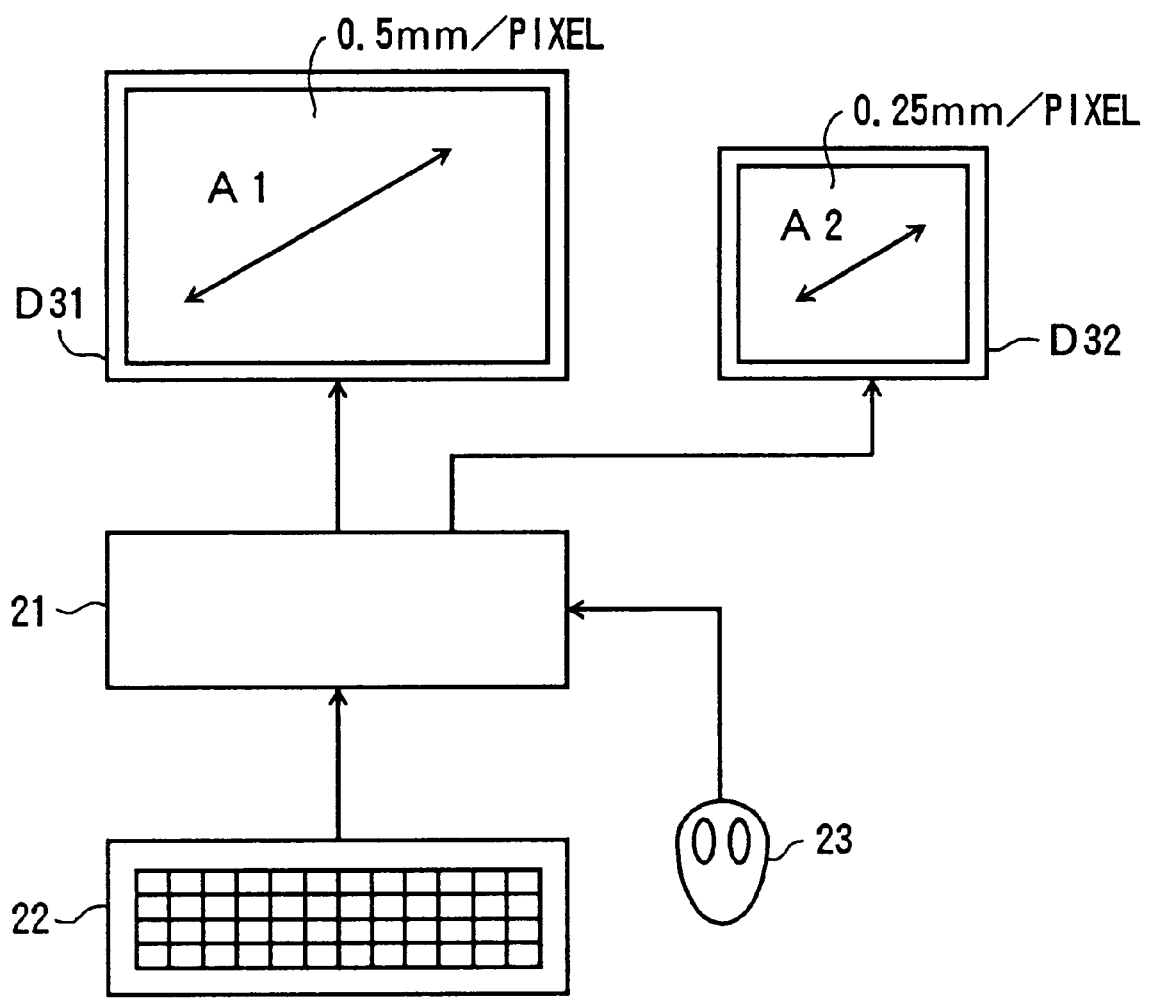
FIG. 5 illustrates a problem in the related art.
Figure 6:
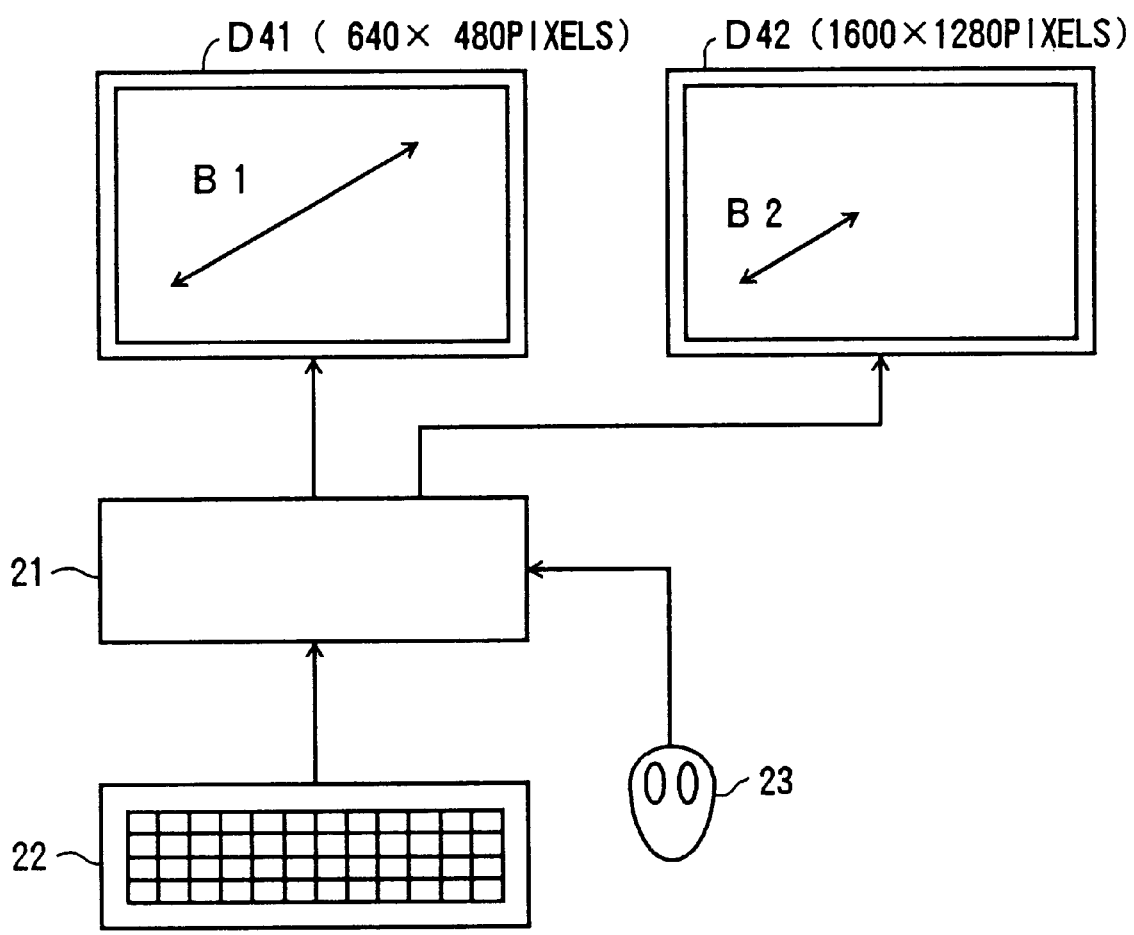
FIG. 6 illustrates another problem in the related art.

According to the first embodiment and its variation, however, the cursor movement rate is double that of the display device D1 available on the display device D2. Therefore, the problem relating to aspect 1(*b*) explained with reference to FIG. 5 is resolved to a great extent.

It is to be noted that the first embodiment and its variation ensure that a positive value of Y coordinate is added to the source Y coordinate when the cursor display position is moved from the display device D1 to the display device D2, and a negative value of Y coordinate is added to the source Y coordinate when the cursor display position is moved from the display device D2 to the display device D1.

For example, when the cursor at the source Y coordinate y1=10 of the display device D1 is moved to the display device D2, 10 is added to the source Y coordinate y1. When the source Y coordinate y1 is 200, 200 is added to the source Y coordinate y1. Thus, the value added to the source Y coordinate y1 varies depending on the value of the source Y coordinate y1. The greater the value of the source Y coordinate y1, the larger the value added to the source Y coordinate y1, resulting in smooth movement of the cursor from the display device D1 to the display device D2.

When the cursor at the source Y coordinate y2=20 of the display device D2 is moved to the display device D1, −10 is added to the source Y coordinate y2. When the source Y coordinate y2 is 400, −200 is added to the source Y coordinate y2. Thus, the value added to the source Y coordinate y2 varies depending on the value of the source Y coordinate y2. The greater the value of the source Y coordinate y2, the smaller the value added to the source Y coordinate y2, resulting in smooth movement of the cursor from the display device D2 to the display device D1.

Figure 7:
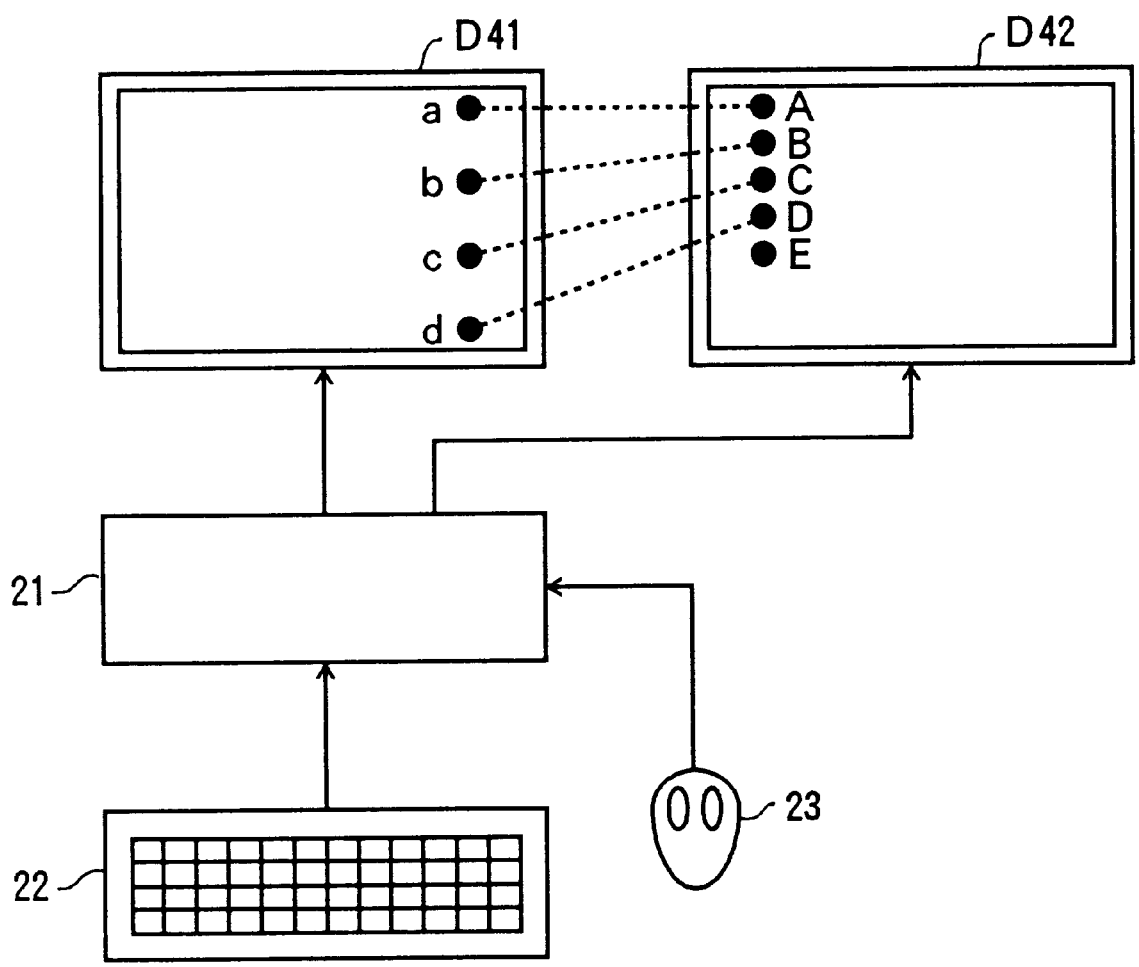
FIG. 7 illustrates still another problem in the related art.

The added value may not necessarily vary in strict accordance with the source Y coordinate. For example, the same value 200 may be added to the source Y coordinate y1=399 and the source Y coordinate y1=400. Accordingly, the second problem described with reference to FIG. 7 (difference in orientation of movement between movement a–A and movement A–D) is resolved. Moreover, according to the first embodiment and its variation, most of the points on the display device D2 will find corresponding points on the display device D1. Very few points on the display device D2 will be like point E as shown in FIG. 7.

Figure 13:
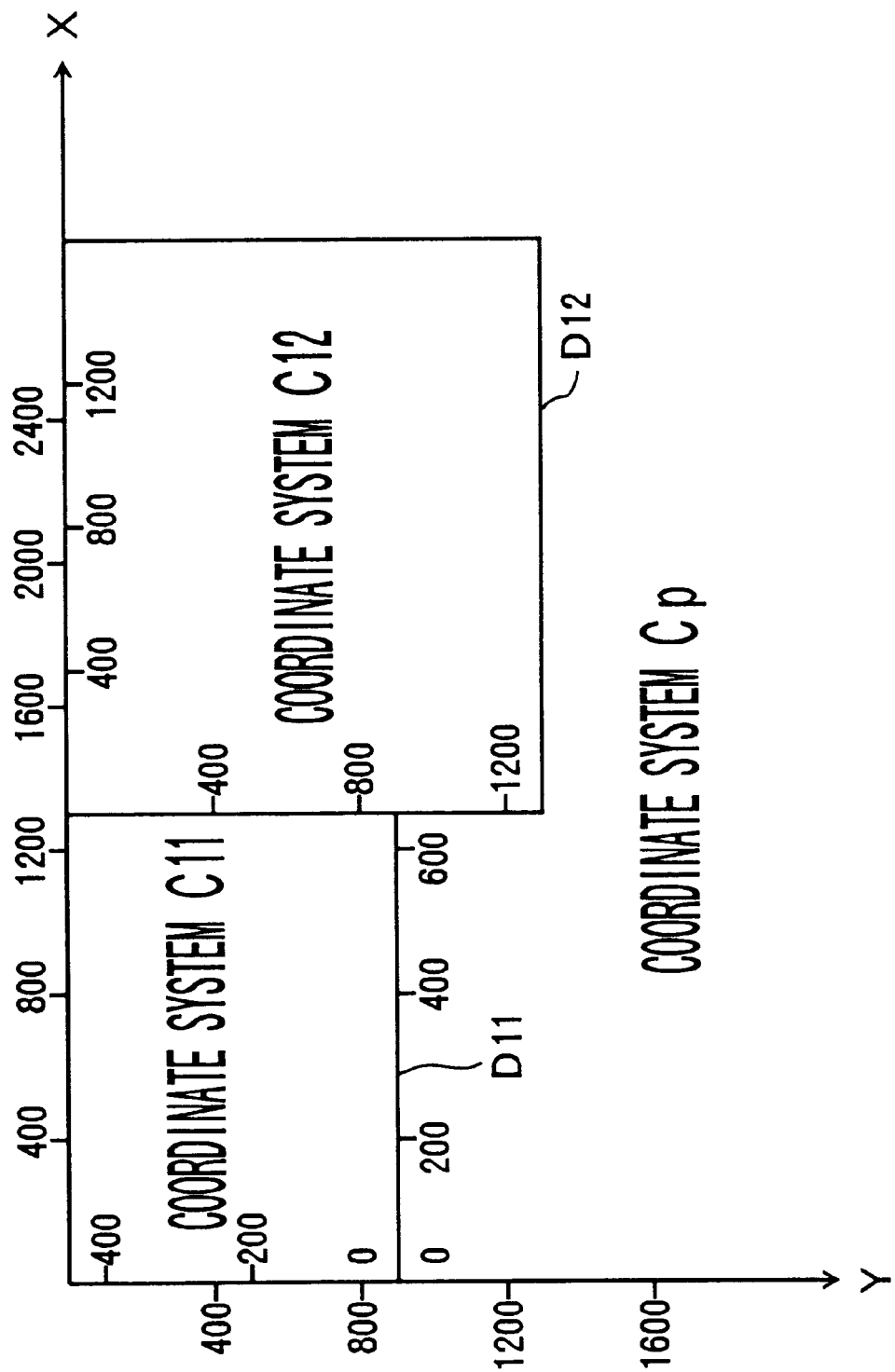
FIG. 13 illustrates the relationship between the virtual coordinate system of the cursor and the coordinate systems of the displays according to a second embodiment.

A description will now be given of a second embodiment of the present invention. FIG. 13 illustrates the relationship between the virtual coordinate system of the cursor and coordinate systems C11 and C12 of display devices D11 and D12, respectively, according to the second embodiment. The ratio between the pixel count of the display device D11 and that of the display device D12 is 2:5. It is to be noted that vertical coordinates of the display device D11 are defined in terms of a distance from the bottom. The other aspects of the construction of a computer system assumed in the second embodiment is the same as that of the first embodiment, and the description thereof is omitted.

The virtual coordinate system Cp shown in FIG. 13 is related to the coordinate system C11 of the display device D11 and the coordinate system C12 of the display device D12 in the following manner.

$$x11 = xp/2 \quad (7)$$

$$y11 = 480 - (yp/2) \quad (8)$$

$$x12 = xp - 1280 \quad (9)$$

$$y12 = yp \quad (10)$$

Figure 14:
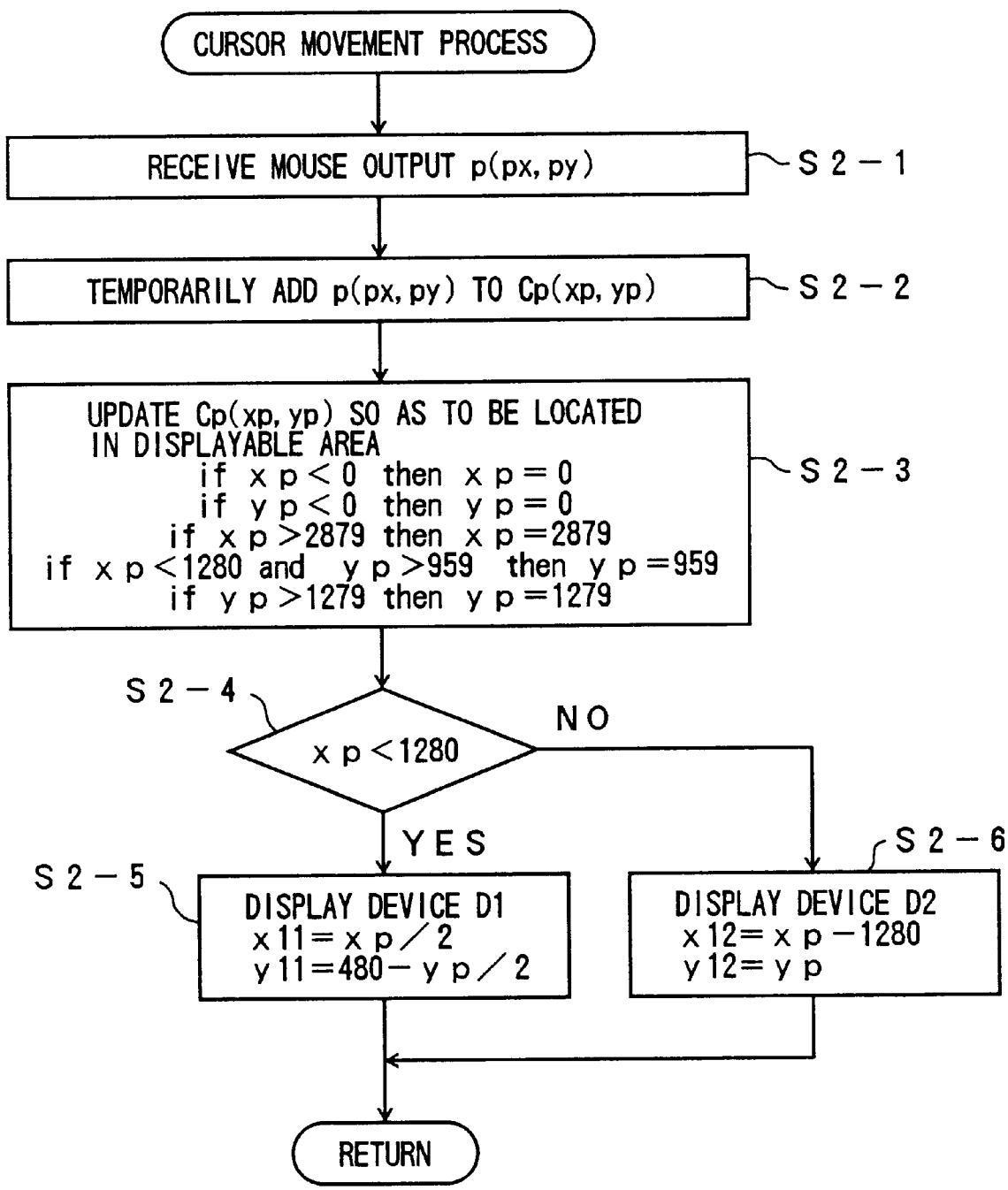
FIG. 14 is a flowchart showing a cursor movement process executed by the CPU 15 according to the second embodiment.

FIG. 14 is a flowchart showing a cursor movement process executed by the CPU 15 according to the second embodiment.

When the mouse 14 is operated, the CPU 15 is supplied with information P(px, py) from the mouse 14 indicating the movement of a cursor. The CPU 15 then adds the information P(px, py) indicating the movement of the cursor to the current coordinates Cp(xp, yp) of the cursor in the virtual coordinate system Cp (steps S2-1, S2-2).

When the information P(px, py) indicating the movement of the cursor is added to the current cursor coordinates Cp(xp, yp) in the virtual coordinate system Cp in step S2-2, the cursor position in the virtual coordinate system Cp is updated.

The CPU 15 then modifies the cursor coordinates Cp(px, py) updated in step S2-2 so that the cursor coordinates Cp(px, py) are located in a displayable area (step S2-3).

More specifically, in step S2-3, if the X coordinate xp of the cursor coordinates Cp(px, py) updated in step S2-2 is smaller than 0, that is, if the X coordinate xp is smaller than the X coordinate of the horizontal edge of the coordinate system C11 of the display device D11, the X coordinate xp is located inside a displayable area of the display device D11 by setting the X coordinate xp to the X coordinate of the horizontal edge of the coordinate system C11 of the display device D11, that is, by setting the X coordinate xp to 0. If the Y coordinate yp is smaller than 0, that is, if the Y coordinate yp is smaller than the Y coordinate of the vertical edge of the coordinate systems C11 and C12 of the display devices D11 and D12, respectively, the Y coordinate yp is located inside the displayable area of the display devices D11 and D12 by setting the Y coordinate yp to the Y coordinate of the vertical edge of the coordinate systems C11 and C12 of the display devices D11 and D12, respectively, that is, by setting the Y coordinate yp to 0.

If the X coordinate xp is greater than 2879, that is, if the X coordinate is greater than the X coordinate of the horizontal edge of the coordinate system C12 of the display device D12, the X coordinate xp is located inside the displayable area of the display device D12 by setting the X coordinate xp to the X coordinate of the horizontal edge of the coordinate system of the display device D12, that is, by setting the X coordinate to 2879.

If the X coordinate xp is smaller than 1280 and the Y coordinate yp is greater than 959, that is, greater than the Y coordinate yp of the vertical edge of the coordinate system C11 of the display device D11, the Y coordinate yp is located inside the displayable area of the display device D11 by setting the Y coordinate yp to the Y coordinate yp of the vertical edge of the coordinate system C11 of the display device D11, that is, by setting the Y coordinate yp to 959.

If the Y coordinate yp is greater than 1279, that is, greater than the Y coordinate of the vertical edge of the coordinate system C12 of the display device D12, the Y coordinate yp is located inside the displayable area of the display device D12 by setting the Y coordinate yp to the Y coordinate of the vertical edge of the coordinate system C12 of the display device D12, that is, by setting the Y coordinate yp to 1279.

With the above-described arrangement, the virtual cursor coordinates Cp(xp, yp) are located in the coordinate systems C11 and C12, that is, in the displayable area of the display devices D11 and D12.

Having located the virtual coordinates Cp(xp, yp) in the coordinate systems C11 and C12 of the display devices D11 and D12, respectively, the CPU 15 then determines whether the cursor is located in the displayable area of the display device D11 or the displayable area of the display device D12 (step S2-4).

More specifically, in step S2-4, the X coordinate xp of the virtual cursor coordinates Cp(xp, yp) is referred to for the determination. If the X coordinate xp is smaller than 1280, it is determined that the cursor is located in the displayable area of the display device D11. If the X coordinate xp is equal to or greater than 1280, it is determined that the cursor is located in the displayable area of the display device D12.

If it is determined in step S2-4 that the cursor is located in the displayable area of the display device D11, the CPU 15 converts the virtual cursor coordinates Cp(xp, yp) to coordinates C11(x11, y11) of the display device D11 and stores image data of the cursor in the video memory 17a for the display device D11 at addresses corresponding to the coordinates C11(x11, y11) (step S2-5).

More specifically, in step S2-5, the CPU 15 sets the X coordinate x11 of the coordinates C11(x11, y11) to xp/2. The CPU 15 also sets the Y coordinate y11 of the coordinates C11(x11, y11) to 480−yp/2.

If it is determined in step S2-4 that the cursor is located in the displayable area of the display device D12, the CPU 15 converts the virtual cursor coordinates Cp(xp, yp) to the coordinates C12(x12, y12) of the display device D12 and stores image data of the cursor in the video memory 17b for the display device D12 at addresses corresponding to the coordinates C12(x12, y12) (step S2-6).

More specifically, in step S2-6, the CPU 15 converts the virtual cursor coordinates Cp(xp, yp) to the coordinates C12(x12, y12) of the display device D12 by subtracting 1280 (the X coordinate of the horizontal edge of the coordinate system C11 of the display device D11) from the X coordinate xp of the virtual cursor coordinates Cp(xp, yp). Since the pixel pitch of the display device D12 is the same as that of the virtual coordinate system, the Y coordinate y12 of the coordinates C12(x12, y12) of the display device D12 is set to the Y coordinate yp.

The second embodiment leaves the problem described with reference to FIG. 7 unsolved. In order to eliminate points like point E that have no corresponding points on the other display, the relationship between the virtual coordinate system and the coordinate system of the displays may be modified.

Figure 15:
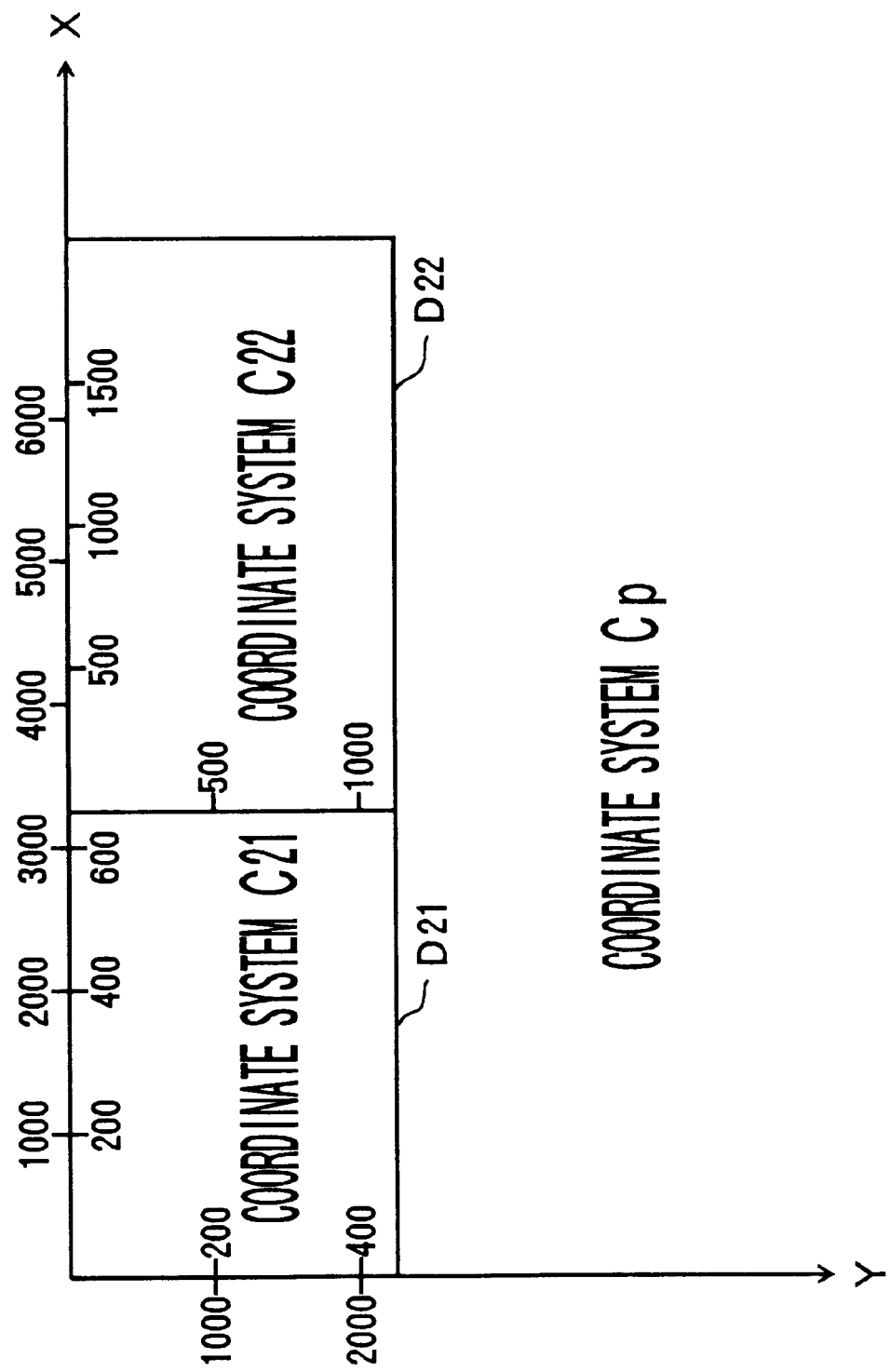
FIG. 15 illustrates the relationship between the virtual coordinate system of the cursor and the coordinate systems of the display devices according to a third embodiment.

A description will now be given of a third embodiment. FIG. 15 illustrates the relationship between the virtual coordinate system of the cursor and coordinate systems C21 and C22 of display devices D21 and D22, respectively, according to the third embodiment. The construction of a computer system assumed in the third embodiment is the same as that of the first embodiment, and the description thereof is omitted.

The virtual coordinate system Cp shown in FIG. 15 is related to the coordinate system C21 of the display device D21 and the coordinate system C22 of the display device D22 in the following manner.

$$x21 = xp/5 \tag{13}$$

$$y21 = yp/5 \tag{14}$$

$$x22 = (xp-3280)/2 \tag{15}$$

$$y22 = yp/2 \tag{16}$$

Figure 16:
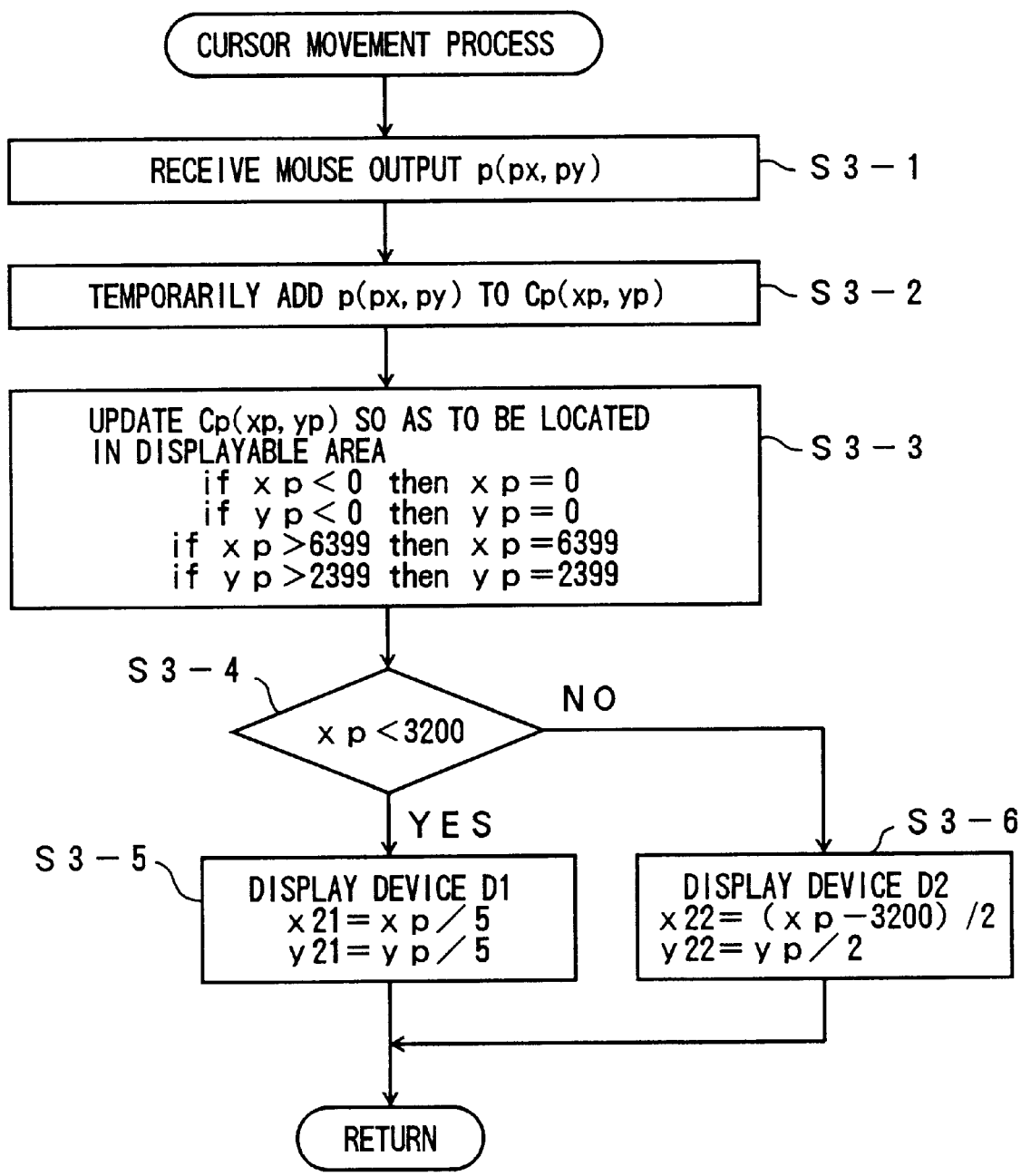
FIG. 16 is a flowchart showing a cursor movement process executed by the CPU according to the third embodiment.

FIG. 16 is a flowchart showing a cursor movement process executed by the CPU 15 according to the third embodiment.

When the mouse 14 is operated, the CPU 15 is supplied with information P(px, py) from the mouse 14 indicating the movement of a cursor. The CPU 15 then adds the information P(px, py) indicating the movement of the cursor to the current coordinates Cp(xp, yp) of the cursor in the virtual coordinate system Cp (steps S3-1, S3-2).

When the information P(px, py) indicating the movement of the cursor is added to the current cursor coordinates Cp(xp, yp) in the virtual coordinate system Cp in step S3-2, the cursor position in the virtual coordinate system Cp is updated.

The CPU 15 then modifies the cursor coordinates Cp(px, py) updated in step S3-2 so that the cursor coordinates Cp(px, py) are located in a displayable area (step S3-3).

More specifically, in step S3-3, if the X coordinate xp of the cursor coordinates Cp(px, py) updated in step S3-2 is smaller than 0, that is, if the X coordinate xp is smaller than the X coordinate of the horizontal edge of the coordinate system C21 of the display device D21, the X coordinate xp is located inside a displayable area of the display device D21 by setting the X coordinate xp to the X coordinate of the horizontal edge of the coordinate system C21 of the display device D21, that is, by setting the X coordinate xp to 0. If the Y coordinate yp is smaller than 0, that is, if the Y coordinate yp is smaller than the Y coordinate of the vertical edge of the coordinate systems C21 and C22 of the display devices D21 and D22, respectively, the Y coordinate yp is located inside the displayable area of the display devices D21 and D22 by setting the Y coordinate yp to the Y coordinate of the vertical edge of the coordinate systems C21 and C22 of the display devices D21 and D22, respectively, that is, by setting the Y coordinate yp to 0.

If the X coordinate xp is greater than 6399, that is, if the X coordinate is greater than the X coordinate of the horizontal edge of the coordinate system C22 of the display device D22, the X coordinate xp is located inside the displayable area of the display device D22 by setting the X coordinate xp to the X coordinate of the horizontal edge of the coordinate system of the display device D22, that is, by setting the X coordinate to 6399.

If the Y coordinate yp is greater than 2399, that is, greater than the Y coordinate of the vertical edge of the coordinate system C21 of the display device D21 and the coordinate system C22 of the display device D22, the Y coordinate yp is located inside the displayable area of the display devices D21 and D22 by setting the Y coordinate yp to the Y coordinate of the vertical edge of the coordinate system C21 of the display device D21 and the coordinate system C22 of the display device D22, that is, by setting the Y coordinate yp to 2399.

With the above-described arrangement, the virtual cursor coordinates Cp(xp, yp) are located in the coordinate systems C21 and C22, that is, in the displayable area of the display devices D21 and D22.

Having located the virtual coordinates Cp(xp, yp) in the coordinate systems C21 and C22 of the display devices D21 and D22, respectively, the CPU 15 then determines whether the cursor is located in the displayable area of the display device D21 or the displayable area of the display device D22 (step S3-4).

More specifically, in step S3-4, the X coordinate xp of the virtual cursor coordinates Cp(xp, yp) is referred to for the determination. If the X coordinate xp is smaller than 3200, it is determined that the cursor is located in the displayable area of the display device D21. If the X coordinate xp is equal to or greater than 3200, it is determined that the cursor is located in the displayable area of the display device D22.

If it is determined in step S3-4 that the cursor is located in the displayable area of the display device D21, the CPU 15 converts the virtual cursor coordinates Cp(xp, yp) to coordinates C21(x21, y21) of the display device D21 and stores image data of the cursor in the video memory 17a for the display device D21 at addresses corresponding to the coordinates C21(x21, y21) (step S3-5).

More specifically, in step S3-5, the CPU 15 sets the X coordinate x21 of the coordinates C21(x21, y21) to xp/5. The CPU 15 also sets the Y coordinate y21 of the coordinates C21(x21, y21) to 480−yp/2.

If it is determined in step S3-4 that the cursor is located in the displayable area of the display device D22, the CPU 15 converts the virtual cursor coordinates Cp(xp, yp) to the coordinates C22(x22, y22) of the display device D22 and stores image data of the cursor in the video memory 17b for the display device D22 at addresses corresponding to the coordinates C22(x22, y22) (step S3-6).

More specifically, in step S3-6, the CPU 15 converts the virtual cursor coordinates Cp(xp, yp) to the coordinates C22(x22, y22) of the display device D22 by subtracting 3200 (the X coordinate of the horizontal edge of the coordinate system C22 of the display device D22) from the X coordinate xp of the virtual cursor coordinates Cp(xp, yp) and then dividing the result by 2, and by dividing the Y coordinates yp by 2.

With the above arrangement, movement across 5 pixels in the virtual coordinate system corresponds to movement across 1 pixel in the coordinate system C21 of the display device D21. Movement across 2 pixels in the virtual coordinate system corresponds to movement across 1 pixel in the coordinate system C22 of the display device D22. Therefore, movement across 5 pixels on the display device D21 corresponds to movement across 2 pixels on the display device D22. Since the ratio between the pixel count of the display device D21 and that of the display device D22 is 2:5, the cursor movement can be processed in an identical manner in the display device D21 and in the display device D22.

While it is assumed in the above description that the mouse cursor is displayed on one display means at a time, portions of the coordinate system C21 and the coordinate system C22 may be overlapped so that the mouse cursor is displayed on two display means at the same time.

Figure 17:
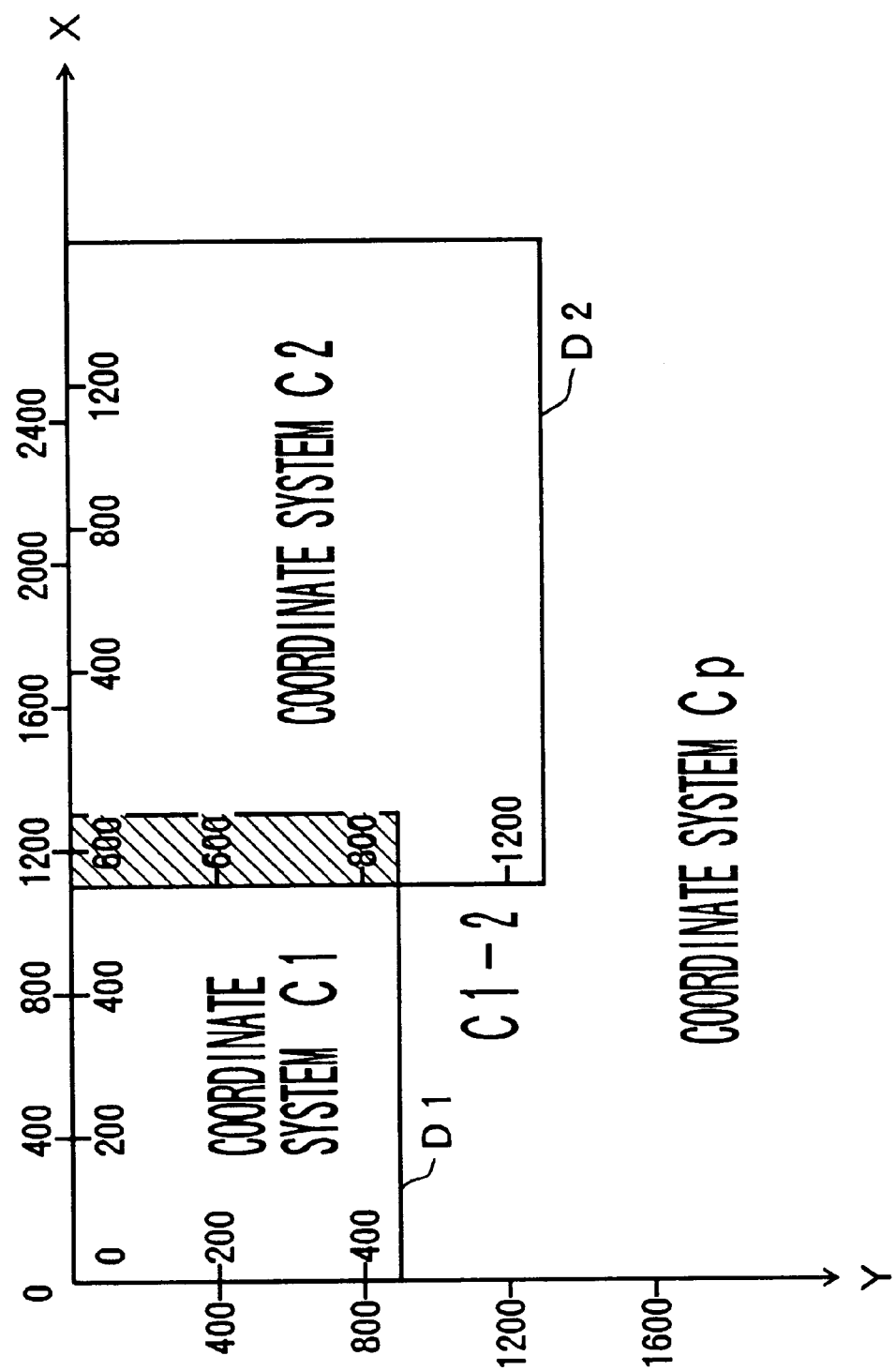
FIG. 17 illustrates the relationship between the virtual coordinate system of the cursor and the coordinate systems of the display devices according to a fourth embodiment.
Figure 18:
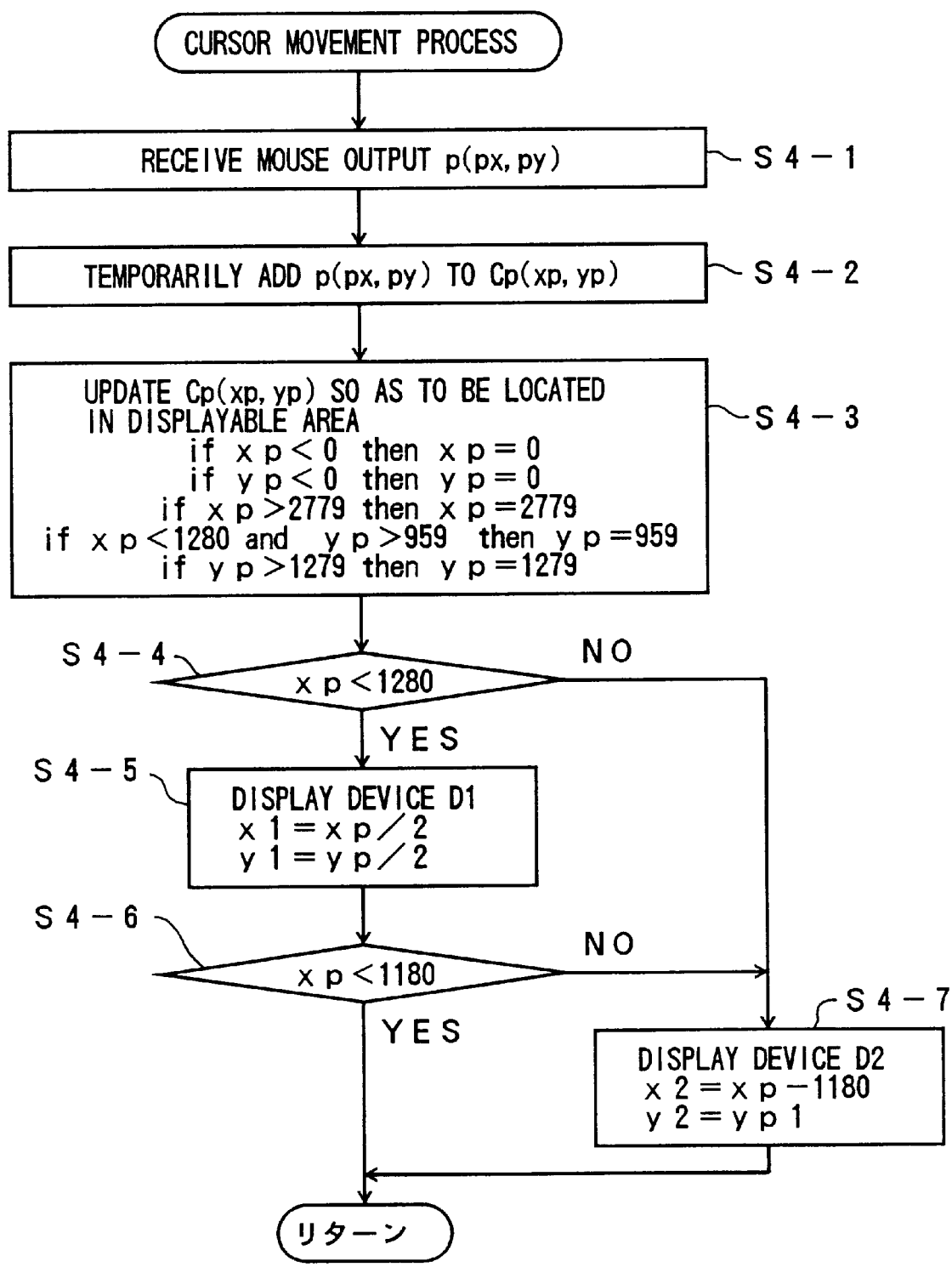
FIG. 18 is a flowchart showing a cursor movement process executed by the CPU according to the fourth embodiment.

A description will now be given of a fourth embodiment of the present invention. FIG. 17 illustrates the relationship between the virtual coordinate system of the cursor and coordinate systems C1 and C2 of display devices D1 and D2, respectively, according to the fourth embodiment. FIG. 18 is a flowchart showing a cursor movement process executed by the CPU 15 according to the fourth embodiment. The construction of a computer system assumed in the fourth embodiment is the same as that of the first embodiment, and the description thereof is omitted.

In the fourth embodiment, the coordinate system C1 of the display device D1 and the coordinate system C2 of the display device D2 are made to overlap each other in a hatched overlapping area C1-2. The cursor at the coordinates located in the overlapping area is displayed both on the display device D1 and the display device D2.

When the mouse 14 is operated, the CPU 15 is supplied with information P(px, py) from the mouse 14 indicating the movement of a cursor. The CPU 15 then adds the information P(px, py) indicating the movement of the cursor to the current coordinates Cp(xp, yp) of the cursor in the virtual coordinate system Cp (steps S4-1, S4-2).

When the information P(px, py) indicating the movement of the cursor is added to the current cursor coordinates Cp(xp, yp) in the virtual coordinate system Cp in step S4-2, the cursor position in the virtual coordinate system Cp is updated.

The CPU 15 then modifies the cursor coordinates Cp(px, py) updated in step S4-2 so that the cursor coordinates Cp(px, py) are located in a displayable area (step S4-3).

More specifically, in step S4-3, if the X coordinate xp of the cursor coordinates Cp(px, py) updated in step S4-2 is smaller than 0, that is, if the X coordinate xp is smaller than the X coordinate of the horizontal edge of the coordinate system C1 of the display device D1, the X coordinate xp is located inside a displayable area of the display device D1 by setting the X coordinate xp to the X coordinate of the horizontal edge of the coordinate system C1 of the display device D1, that is, by setting the X coordinate xp to 0. If the Y coordinate yp is smaller than 0, that is, if the Y coordinate yp is smaller than the Y coordinate of the vertical edge of the coordinate systems C1 and C2 of the display devices D1 and D2, the Y coordinate yp is located inside the displayable area of the display devices D1 and D2 by setting the Y coordinate yp to the Y coordinate of the vertical edge of the coordinate systems C1 and C2 of the display devices D1 and D2, that is, by setting the Y coordinate yp to 0.

If the X coordinate xp is greater than 2779, that is, if the X coordinate is greater than the X coordinate of the horizontal edge of the coordinate system C2 of the display device D2, the X coordinate xp is located inside the displayable area of the display device D2 by setting the X coordinate xp to the X coordinate of the horizontal edge of the coordinate system of the display device D2, that is, by setting the X coordinate to 2779.

If the X coordinate xp is smaller than 1180 and the Y coordinate yp is greater than 959, that is, greater than the Y coordinate yp of the vertical edge of the coordinate system C1 of the display device D1, the Y coordinate yp is located inside the displayable area of the display device D1 by setting the Y coordinate yp to the Y coordinate yp of the vertical edge of the coordinate system C1 of the display device D1, that is, by setting the Y coordinate yp to 959.

If the Y coordinate yp is greater than 1179, that is, greater than the Y coordinate of the vertical edge of the coordinate system C2 of the display device D2, the Y coordinate yp is located inside the displayable area of the display device D2 by setting the Y coordinate yp to the Y coordinate of the vertical edge of the coordinate system C2 of the display device D2, that is, by setting the Y coordinate yp to 1179.

With the above-described arrangement, the virtual cursor coordinates Cp(xp, yp) are located in the coordinate systems C1 and C2, that is, in the displayable area of the display devices D1 and D2.

Having located the virtual coordinates Cp(xp, yp) in the coordinate systems C1 and C2 of the display devices D1 and D2, respectively, the CPU 15 then determines whether the cursor is located in the displayable area of the display device D1 or the displayable area of the display device D2 (steps S4-4, S4-6).

More specifically, in steps S4-4 and S4-6, the X coordinate xp of the virtual cursor coordinates Cp(xp, yp) is referred to for the determination. If it is found in step S4-4 that the X coordinate xp is smaller than 1280, it is determined that the cursor is displayed only on the display device D1 or is displayed in the overlapping area C1-2. If the X coordinate xp is equal to or greater than 1280, it is determined that the cursor is displayed only on the display device D2. If it is found in step S4-6 that the X coordinate xp is smaller than 1180, it is determined that the cursor is displayed only on the display device D1.

If it is determined in steps S4-4 and S4-6 that the cursor is displayed only on the display device D1, the CPU 15 converts the virtual cursor coordinates Cp(xp, yp) to coordinates C1(x1, y1) of the display device D1 and stores image data of the cursor in the video memory 17a for the display device D1 at addresses corresponding to the coordinates C1(x1, y1) (step S4-5).

More specifically, in step S4-5, the CPU 15 sets the X coordinate x1 of the coordinates C1(x1, y1) to xp/2. The CPU 15 also sets the Y coordinate y1 of the coordinates C1(x1, y1) to yp/2.

If it is determined in step S4-4 that the cursor is displayed only on the display device D2, the CPU 15 converts the virtual cursor coordinates Cp(xp, yp) to the coordinates C2(x2, y2) of the display device D2 and stores image data of the cursor in the video memory 17b for the display device D2 at addresses corresponding to the coordinates C2(x2, y2) (step S4-7).

More specifically, in step S4-7, the CPU 15 converts the virtual cursor coordinates Cp(xp, yp) to the coordinates C2(x2, y2) of the display device D2 by subtracting 1180 (the X coordinate of the horizontal edge of the coordinate system C1 of the display device D1) from the X coordinate xp of the virtual cursor coordinates Cp(xp, yp). Since the pixel pitch of the display device D2 is the same as that of the virtual coordinate system, the Y coordinate y2 of the coordinates C2(x2, y2) of the display device D2 is set to the Y coordinate yp.

If it is found in step S4-6 that the X coordinate xp is equal to or greater than 1180, it is determined that the cursor is located in the overlapping area C1-2 where the displayable area of the display device D1 and the displayable area of the display device D2 overlap each other, both the steps S4-5 and S4-7 are executed so that the cursor is displayed on both the display device D1 and the display device D2.

With the above arrangement, the cursor at the coordinates located in the overlapping area C1-2 is displayed both on the display device D1 and the display device D2. Therefore, it is easy to keep track of the cursor position and the operability is improved.

Briefly reviewing, the present invention resolves or relieves the following problems inherent to the related art:

1) Inability to change the rate of movement of the cursor depending on the display means.

2) Inability to match the on-screen distance of cursor movement on one display means with that of another display means in response to a given physical movement of a mouse.

3) Inability to match the on-screen rate of cursor movement on one display means with that of another display means in response to a given physical movement of a mouse.

4) Unnatural movement of the cursor between the display means.

A description will now be given of variations of the fourth embodiment.

In a first variation, the coordinate system C1 of the display device D1 having a pixel count of B1 and the coordinate system C2 of the display device D2 having a pixel count of B2 larger than the pixel count B1 are connected to each other such that the coordinate axes are aligned with each other. A cursor position calculation is introduced such that the greater the values of the cursor coordinates on the display device D2, the smaller the amount of movement of the cursor on the display device D2 in response to a unit mouse movement. In this way, smooth cursor movement in the overlapping area is ensured.

Figure 19:
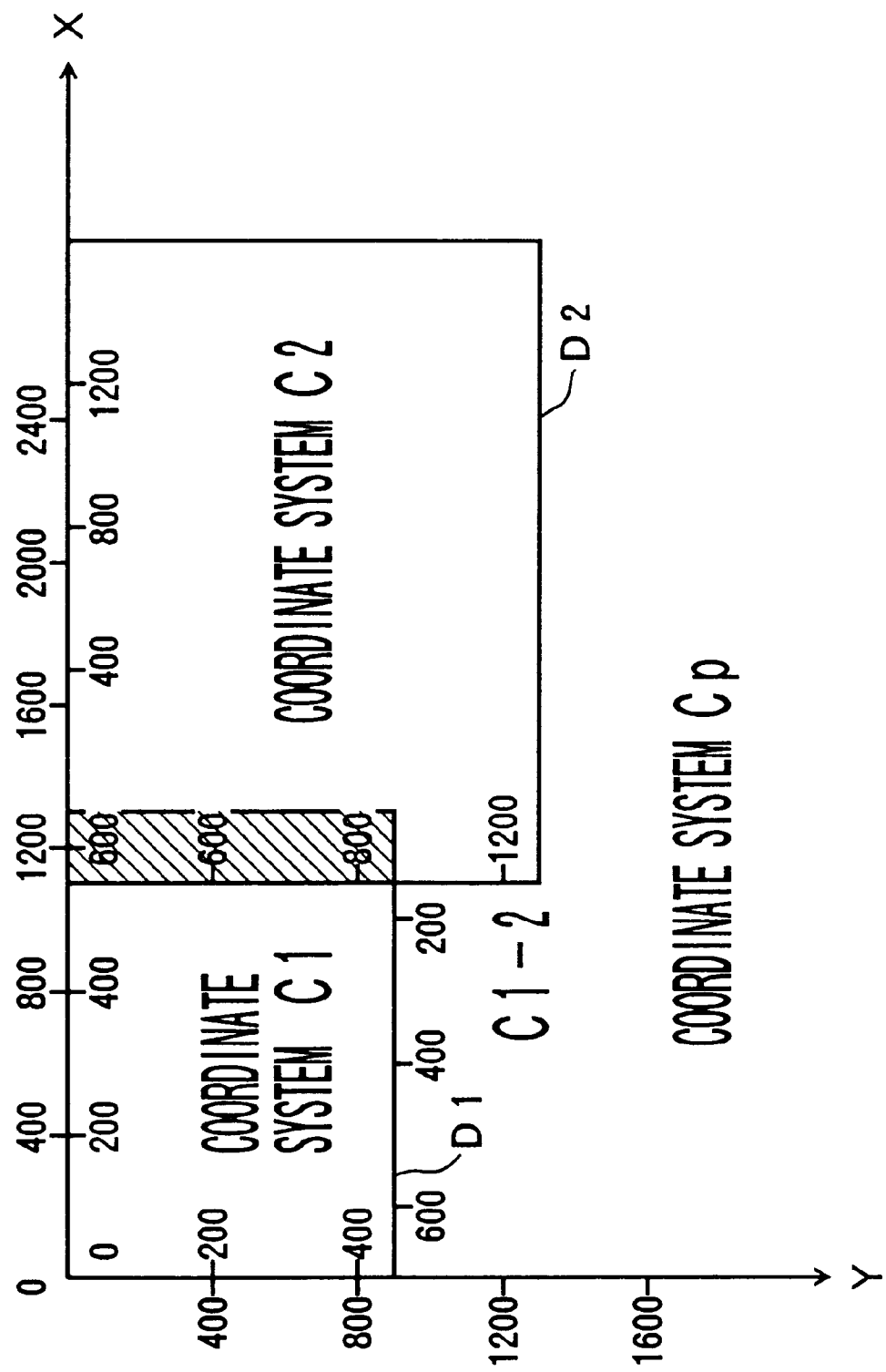
FIG. 19 illustrates the relationship between the virtual coordinate system of the cursor and the coordinate systems of the display devices according to variations of the fourth embodiment.

In a second variation, the coordinate system C1 of the display device D1 having a pixel count of B1 and the coordinate system C2 of the display device D2 having a pixel count of B2 larger than the pixel count B1 are connected to each other such that the coordinate axes are 180° horizontally offset from each other (see FIG. 19). A cursor position calculation is introduced such that the greater the values of the cursor coordinates on the display device D2, the greater the amount of movement of the cursor on the display device D2 in response to a unit mouse movement. The second variation also ensures smooth cursor movement in the overlapping area.

While the first and second variations ensure smooth movement of the cursor by controlling the cursor movement depending on the pixel count of a display device. The cursor movement may be controlled depending on the pixel pitch.

For example, a third variation of the fourth embodiment may be such that the coordinate system C51 of the display device D51 having a pixel pitch of S1 and the coordinate system C52 of the display device D52 having a pixel pitch of S2 greater than the pixel pitch S1 are connected to each other such that the coordinate axes are aligned. A cursor position calculation is introduced such that the greater the values of the cursor coordinates on the display device D51, the smaller the amount of movement of the cursor on the display device D1 in response to a unit mouse movement. As a result, the cursor movement per a unit mouse movement becomes small as the cursor approaches the display device D52 so as to become more like the movement on the display device D52 in the overlapping area. In this way, smooth cursor movement between the display device D51 and the display device D52 is ensured.

A fourth variation of the fourth embodiment will be described. The coordinate system C51 of the display device D51 having a pixel pitch of S1 and the coordinate system C52 of the display device D52 having a pixel pitch of S2 greater than the pixel pitch S1 are connected to each other such that the coordinate axes are 180° horizontally rotated from each other (see FIG. 19). A cursor portion calculation is introduced such that the greater the values of the cursor coordinates on the display device D51, the greater the amount of movement of the cursor on the display device D1 in response to a unit mouse movement. As a result, the cursor movement per a unit mouse movement becomes great as the cursor moves away from the display device D52 so as to become more like the movement on the display device D52 in the overlapping area. In this way, smooth cursor movement between the display device D51 and the display device D52 is ensured. Since the cursor at a position on the display device D1 away from the display device D2 is moved at a rate adapted for the pixel count of the display device D1, the cursor can be moved efficiently on the display device D1.

It is to be noted that the first through fourth embodiments of the present invention could equally be applied to a desktop personal computer system and a notebook personal computer system characterized by a small displayable area.

Figure 20:
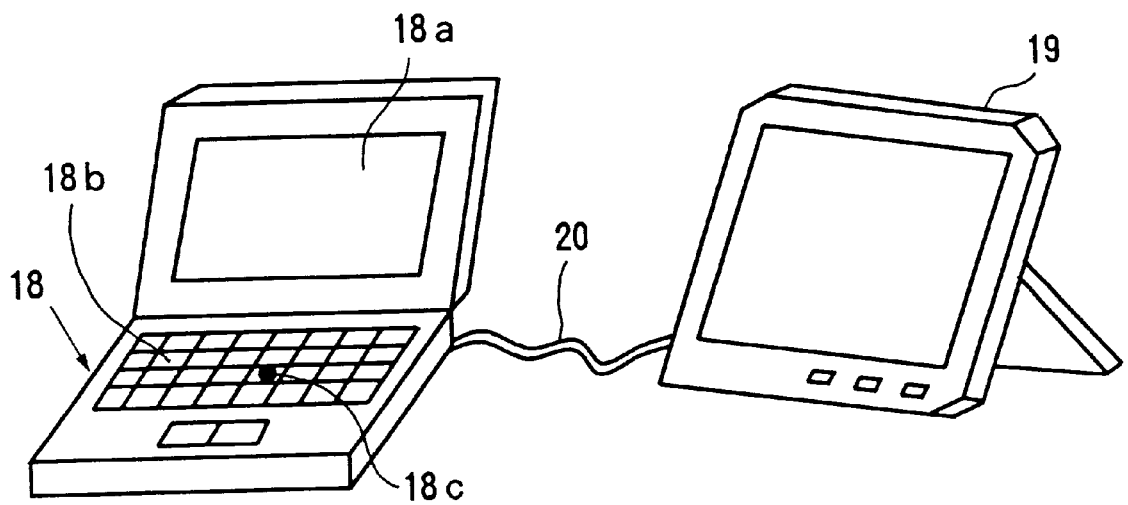
FIG. 20 shows a schematic construction of a notebook personal computer system to which the embodiments of the present invention could be applied.

FIG. 20 shows a schematic construction of a notebook personal computer system to which the embodiments of the present invention could be applied. Referring to FIG. 20, a notebook personal computer system comprises a notebook personal computer 18, an auxiliary display 19 and an interface cable 20.

The notebook personal computer 18 is provided with a display 18a, a keyboard 11b and a pointing device 11c. The auxiliary display 19, connected to the notebook personal computer via a digital interface, is designed to display a work area different from the area displayed by the display 18a.

When a cursor movement is prescribed by the pointing device 11c, one of the cursor movement processes described with reference to FIGS. 11 through 16 is employed depending on the pixel count of the display 18a and the auxiliary display 19. Thus, smooth cursor movement between the display 18a and the auxiliary display 19 is ensured allowing efficient operation on the notebook personal computer system.

The present invention is not limited to the above described embodiments, and variations and modifications may be made without departing from the scope of the present invention.

What is claimed is:

1. An image display system provided with a plurality of display means and a pointing device for moving a cursor between said plurality of display means, comprising:

cursor position detecting means for detecting a cursor movement input that corresponds to an operation of the pointing device; and cursor movement control means for moving the cursor commensurate with the operation of the pointing device such that, given the same cursor movement input detected by said cursor position detecting means, the number of pixels traversed by the cursor differs from one display means to another in a situation where different images are displayed on the plurality of display means, wherein each of the plurality of display means have different imaging capabilities.

2. The image display system as claimed in claim 1, further comprising setting means for setting the amount of on-screen cursor movement to adapt for a displayable area of each display means, commensurate with the cursor movement input detected by said cursor position detecting means.

3. The image display system as claimed in claim 1, wherein said cursor movement control means changes the amount of on-screen cursor movement, commensurate with the cursor movement input detected by said cursor position detecting means, depending on a pixel count of said plurality of display means.

4. The image display system as claimed in claim 1, wherein said cursor movement control means changes the amount of on-screen cursor movement, commensurate with the cursor movement input detected by said cursor position detecting means, depending on a pixel pitch of said plurality of display means.

5. The image display system as claimed in claim 1, wherein said cursor movement control means change an orientation of on-screen cursor movement from one display means to another, commensurate with the cursor movement input detected by said cursor position detecting means.

6. An image display system provided with a plurality of display means and a pointing device for moving a cursor between said plurality of display means, comprising:

cursor position detecting means for detecting a cursor movement input that corresponds to an operation of the pointing device; and cursor movement control means for moving the cursor commensurate with the operation of the pointing device, wherein a coordinate system for each of said plurality of display means that is located on a coordinate system for said pointing device such that coordinate axes of the coordinate system for each of said plurality of display means are determined depending on a pixel arrangement of each of said plurality of display means, and said cursor movement control means maps a cursor movement input on the coordinate system for said pointing device to the coordinate system for each of said plurality of display means, thus ensuring required on-screen movement on each of said plurality of display means.

7. The display system as claimed in claim 6, wherein coordinate systems for at least two of said plurality of display means overlap each other on the coordinate system for said pointing device.

8. The image display system as claimed in claim 6, wherein said plurality of display means include a first display means having an on-screen pixel count of B1 and a second display means having an on-screen pixel count of B2 smaller than the pixel count of B1, a first coordinate system of said first display means being related to a second coordinate system of said second display means such that coordinate axes of said first and second coordinate systems are aligned with each other; and said cursor movement control means controls on-screen cursor movement such that the greater the coordinate values of the cursor on said first coordinate system of said first display means, the smaller the amount of on-screen cursor movement.

9. The image display system as claimed in claim 6, wherein said plurality of display means include a third display means having an on-screen pixel count of B1 and a fourth display means having an on-screen pixel count of B2 smaller than the pixel count of B1, a third coordinate system of said third display means being related to a fourth coordinate system of said fourth display means such that coordinate axes of said third and fourth coordinate systems are 180° horizontally offset from each other; and said cursor movement control means controls on-screen cursor movement such that the greater the coordinate values of the cursor on said third coordinate system of said third display means, the greater the amount of on-screen cursor movement.

10. The image display system as claimed in claim 6, wherein said plurality of display means include a fifth display means having an on-screen pixel pitch of S1 and a sixth display means having an on-screen pixel pitch of S2 greater than the pixel pitch of S1, a fifth coordinate system of said fifth display means being related to a sixth coordinate system of said sixth display means such that coordinate axes of said fifth and sixth coordinate systems are aligned with each other; and said cursor movement control means controls on-screen cursor movement such that the greater the coordinate values of the cursor on said fifth coordinate system of said fifth display means, the smaller the amount of on-screen cursor movement.

11. The image display system as claimed in claim 6, wherein
- said plurality of display means include a seventh display means having an on-screen pixel pitch of S1 and a eighth display means having an on-screen pixel pitch of S2 greater than the pixel pitch of S1, a seventh coordinate system of said seventh display means being related to a eighth coordinate system of said eighth display means such that coordinate axes of said seventh and eighth coordinate systems are 180° horizontally offset from each other; and
- said cursor movement control means controls on-screen cursor movement such that the greater the coordinate values of the cursor on said seventh coordinate system of said seventh display means, the greater the amount of on-screen cursor movement.

12. An image display system provided with a plurality of display means and a pointing device for moving a cursor between said plurality of display means, comprising:
- cursor position detecting means for detecting a cursor movement input that corresponds to an operation of the pointing device; and
- cursor movement control means for moving the cursor commensurate with the operation of the pointing device such that, given the same cursor movement input detected by said cursor position detecting means, the number of pixels traversed by the cursor differs from one display means to another based upon a display capability of each of the plurality of display means, wherein
- each of the plurality of display means have different imaging capabilities.

* * * * *